(12) United States Patent
Yu

(10) Patent No.: US 10,608,871 B2
(45) Date of Patent: Mar. 31, 2020

(54) NETWORK FUNCTIONS VIRTUALIZATION BASED FAULT PROCESSING METHOD AND APPARATUS

(71) Applicant: HUAWEI TECHNOLOGIES CO., LTD., Shenzhen, Guangdong (CN)

(72) Inventor: Fang Yu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/722,347

(22) Filed: Oct. 2, 2017

(65) Prior Publication Data

US 2018/0026832 A1 Jan. 25, 2018

Related U.S. Application Data

(63) Continuation of application No. PCT/CN2015/076183, filed on Apr. 9, 2015.

(51) Int. Cl.
*H04L 12/24* (2006.01)

(52) U.S. Cl.
CPC ...... *H04L 41/0672* (2013.01); *H04L 41/0631* (2013.01); *H04L 41/0668* (2013.01); *H04L 41/083* (2013.01); *H04L 41/0836* (2013.01); *H04L 41/0893* (2013.01); *H04L 41/5003* (2013.01); *H04L 41/0869* (2013.01); *H04L 41/0896* (2013.01)

(58) Field of Classification Search
None
See application file for complete search history.

(56) References Cited

U.S. PATENT DOCUMENTS

| 2006/0206658 A1 | 9/2006 | Hendel et al. |
| 2011/0103392 A1 | 5/2011 | Fan et al. |
| 2014/0201374 A1 | 7/2014 | Ashwood-Smith et al. |
| 2014/0241247 A1 | 8/2014 | Kempf et al. |

(Continued)

FOREIGN PATENT DOCUMENTS

| CN | 104115447 A | 10/2014 |
| CN | 104170323 A | 11/2014 |
| CN | 104410672 A | 3/2015 |
| EP | 3 024 174 A1 | 5/2016 |
| EP | 3 119 034 A1 | 1/2017 |

(Continued)

OTHER PUBLICATIONS

Sanchez, Jose et al, Softwarized 5G Networks Resiliency with Self-Healing, 5G for Ubiquitous Connectivity, 2014 1st International Conference, Nov. 26-28, 2014.*

(Continued)

*Primary Examiner* — Kent Krueger
(74) *Attorney, Agent, or Firm* — Kilpatrick Townsend & Stockton LLP

(57) ABSTRACT

An embodiment of the present invention provides a NFV based fault processing method. The method includes: determining a NFVI fault; obtaining self-healing policy information used to indicate whether to perform a self-healing operation on the NFVI fault; and performing the self-healing operation on the NFVI fault when the self-healing policy information indicates that the self-healing operation is to be performed on the NFVI fault. Therefore, time for reporting and making a fault analysis for the infrastructure fault can be saved, the infrastructure fault is rectified as quickly as possible, a fault processing delay is reduced, and system performance can be improved.

21 Claims, 14 Drawing Sheets

(56) References Cited

U.S. PATENT DOCUMENTS

| | | |
|---|---|---|
| 2014/0317293 A1 | 10/2014 | Shatzkamer et al. |
| 2016/0224409 A1 | 8/2016 | Liu et al. |
| 2017/0034318 A1 | 2/2017 | Gong et al. |
| 2017/0187572 A1 | 6/2017 | Wu et al. |

FOREIGN PATENT DOCUMENTS

| | | |
|---|---|---|
| RU | 2393534 | 6/2010 |
| WO | 2015042937 A1 | 4/2015 |

OTHER PUBLICATIONS

Office Action, dated Aug. 31, 2018, in Russian Application No. 2017134942 (24 pp.).

International Search Report dated Dec. 23, 2015 in corresponding International Patent Application No. PCT/CN2015/076183.

"Network Functions Virtualisation (NFV); Management and Orchestration," ETSI GS NFV-MAN 001 v1.1.1, Sophia Antipolis Cedex, France, Dec. 2014.

Margaret Chiosi et al. "Network Functions Virtualisation: An Introduction, Benefits, Enablers, Challengers & Call for Action," SDN and OpenFlow World Congress, Darmstadt, Germany, Issue 1, Oct. 22-24, 2012.

"Network Functions Virtualisation (NFV); Resiliency Requirements," ETSI GS NFV-REL 001, V1.1.1, Jan. 2015, XP014235737, 82 pgs.

Extended European Search Report dated Mar. 8, 2018, in corresponding European Patent Application No. 15888162.3, 11 pgs.

Office Action, dated Feb. 2, 2019, in Chinese Application No. 201580030586.9 (11 pp.).

\* cited by examiner

NETWORK FUNCTIONS VIRTUALIZATION BASED FAULT PROCESSING METHOD AND APPARATUS

CROSS-REFERENCE TO RELATED APPLICATIONS

This application is a continuation of International Application No. PCT/CN2015/076183, filed on Apr. 9, 2015, the disclosure of which is hereby incorporated by reference in its entirety.

TECHNICAL FIELD

The present disclosure relates to the field of communications technologies, and more specifically, to a network functions virtualization based fault processing method and an apparatus.

BACKGROUND

Currently, a network functions virtualization (NFV) technology attracts more and more attentions. On Oct. 23, 2012, 13 operators released an NFV white paper, and announced setup of a network functions virtualization specification working group (NFV ISG) in the European Telecommunication Standards Institute (ETSI).

The operators set up the NFV ISG with a view to defining operator requirements for network functions virtualization and related technical reports, wishing to implement some network functions on universal high-performance servers, switches, and storage devices. This requires that network functions should be implemented in a software form, run on hardware of a universal server, and be migrated, instantiated, and deployed in different positions in a network according to requirements. In addition, installation of new devices is not required. Separation of software from hardware can be implemented on various network devices such as servers, routers, storage devices, and switches by using the NFV technology.

In a conventional NFV management and orchestration (MANO) system, due to a layered NFV system architecture, NFV faults may occur at different layers in the network, for example, infrastructure faults at a network functions virtualization infrastructure (NFVI) layer, virtualized network function (VNF) software faults, and network faults. The infrastructure faults may include hardware faults (for example, a hard disk input/output fault, a server power outage, and a port fault), virtual machine (VM) faults, and the like.

In the prior art, an NFV fault needs to be reported to a fault correlation entity and a fault decision entity first. The fault is rectified only after the fault correlation entity analyzes a root cause of the fault and the fault decision entity makes a fault processing decision. Therefore, from detection of the NFV fault to fault rectification, there is an analysis and processing delay, so that the fault decision entity can make a correct decision. However, an NFVI fault is different from a VNF fault. The VNF fault may be caused by another fault. The infrastructure fault itself is a root-cause fault, and does not need a root cause analysis and decision. Therefore, in a method for processing an infrastructure fault in the prior art, a processing delay is long.

SUMMARY

Embodiments of the present invention provide a network functions virtualization based fault processing method and an apparatus, to reduce an infrastructure fault processing delay.

According to a first aspect, a network functions virtualization based fault processing method is provided and includes: determining a network functions virtualization infrastructure NFVI fault; obtaining self-healing policy information, where the self-healing policy information is used to indicate whether to perform a self-healing operation on the NFVI fault; and performing the self-healing operation on the NFVI fault when the self-healing policy information indicates that the self-healing operation is to be performed on the NFVI fault.

With reference to the first aspect, in a first possible implementation of the first aspect, the self-healing policy information includes updated self-healing policy information.

With reference to the first aspect or the first possible implementation of the first aspect, in a second possible implementation of the first aspect, after the performing the self-healing operation when the self-healing policy information indicates that the self-healing operation is to be performed on the NFVI fault, the method further includes: sending self-healing start information, where the self-healing start information is used to indicate that the self-healing operation on the NFVI fault is started.

With reference to the second possible implementation of the first aspect, in a third possible implementation of the first aspect, after the sending self-healing start information, the method further includes: sending self-healing complete information, where the self-healing complete information is used to indicate that the self-healing operation on the NFVI fault is complete.

With reference to any one of the first aspect, or the first to the third possible implementations of the first aspect, in a fourth possible implementation of the first aspect, the method further includes: sending fault information of the NFVI fault when the self-healing policy information indicates that the self-healing operation on the NFVI fault is forbidden.

With reference to any one of the first aspect, or the first to the fourth possible implementations of the first aspect, in a fifth possible implementation of the first aspect, the performing the self-healing operation when the self-healing policy information indicates that the self-healing operation is to be performed on the NFVI fault includes: selecting a new server for deploying a virtual machine that is affected by the NFVI fault; and creating a virtual machine.

With reference to any one of the first aspect, or the first to the fifth possible implementations of the first aspect, in a sixth possible implementation of the first aspect, the self-healing policy information includes a virtual machine identity, fault type information, and self-healing action information, or the self-healing policy information includes a virtual machine identity, a virtual link identity, fault type information, and self-healing action information, where the self-healing action information includes starting self-healing information and/or forbidding self-healing information.

According to a second aspect, a network functions virtualization based fault processing method is provided and includes: determining self-healing policy information, where the self-healing policy information is used to indicate whether to perform a self-healing operation on the NFVI fault; and sending the self-healing policy information, so that the self-healing operation is performed on the NFVI fault when the self-healing policy information indicates that the self-healing operation is to be performed on the determined network functions virtualization infrastructure NFVI fault.

With reference to the second aspect, in a first possible implementation of the second aspect, the determining self-healing policy information includes: determining a prestored self-healing policy, where the prestored self-healing policy includes a network functions virtualization VNF self-healing policy and/or a network service NS self-healing policy; and mapping or converting the prestored self-healing policy to determine the self-healing policy information.

With reference to the first possible implementation of the second aspect, in a second possible implementation of the second aspect, the method further includes: updating the prestored self-healing policy.

With reference to the first possible implementation of the second aspect or the second possible implementation of the second aspect, in a third possible implementation of the second aspect, the VNF self-healing policy includes a VNF identity and/or a VNF component identity, and fault type information and self-healing action information.

With reference to any one of the first to the third possible implementations of the second aspect, in a fourth possible implementation of the second aspect, the NS self-healing policy includes the VNF self-healing policy and a self-healing policy for virtual links between multiple VNFs, where the self-healing policy for the virtual links includes virtual link identities and self-healing action information.

With reference to any one of the second aspect, or the first to the fourth possible implementations of the second aspect, in a fifth possible implementation of the second aspect, the method further includes: receiving self-healing start information, where the self-healing start information is used to indicate that the self-healing operation on the NFVI fault is started; and forbidding, according to the self-healing start information, repeatedly starting the self-healing operation.

With reference to the fifth possible implementation of the second aspect, in a sixth possible implementation of the second aspect, after the receiving self-healing start information, the method further includes: receiving self-healing complete information, where the self-healing complete information is used to indicate that the self-healing operation on the NFVI fault is complete.

With reference to any one of the second aspect, or the first to the sixth possible implementations of the second aspect, in a seventh possible implementation of the second aspect, the self-healing policy information includes a virtual machine identity, fault type information, and self-healing action information, or the self-healing policy information includes a virtual machine identity, a virtual link identity, fault type information, and self-healing action information, where the self-healing action information includes starting self-healing information and/or forbidding self-healing information.

According to a third aspect, a network functions virtualization based fault processing method is provided and includes: performing a self-healing operation on a determined network functions virtualization infrastructure NFVI fault; and sending status information of the NFVI fault, where the status information is used to indicate that repeatedly starting the self-healing operation is forbidden.

With reference to the third aspect, in a first possible implementation of the third aspect, the status information includes self-healing start information, and the self-healing start information is used to indicate that the self-healing operation on the NFVI fault is started.

With reference to the third aspect or the first possible implementation of the third aspect, in a second possible implementation of the third aspect, after the sending status information of the NFVI fault, the method further includes: sending self-healing complete information, where the self-healing complete information is used to indicate that the self-healing operation on the NFVI fault is complete.

With reference to any one of the third aspect, or the first to the second possible implementations of the third aspect, in a third possible implementation of the third aspect, the performing a self-healing operation on a determined network functions virtualization infrastructure NFVI fault includes: selecting a new server for deploying a virtual machine that is affected by the NFVI fault; and creating a virtual machine.

According to a fourth aspect, a network functions virtualization based fault processing method is provided and includes: obtaining status information of a network functions virtualization infrastructure NFVI fault, where the status information is used to indicate that repeatedly starting a self-healing operation is forbidden; and forbidding, according to the status information, repeatedly starting the self-healing operation.

With reference to the fourth aspect, in a first possible implementation of the fourth aspect, the status information includes self-healing start information, and the self-healing start information is used to indicate that the self-healing operation on the NFVI fault is started.

With reference to the fourth aspect or the first possible implementation of the fourth aspect, in a second possible implementation of the fourth aspect, after the obtaining status information of a network functions virtualization infrastructure NFVI fault, the method further includes: obtaining self-healing complete information, where the self-healing complete information is used to indicate that the self-healing operation on the NFVI fault is complete.

According to a fifth aspect, an apparatus is provided and includes: a determining unit, configured to determine a network functions virtualization infrastructure NFVI fault; an obtaining unit, configured to obtain self-healing policy information, where the self-healing policy information is used to indicate whether to perform a self-healing operation on the NFVI fault; and a self-healing unit, configured to perform the self-healing operation on the NFVI fault when the self-healing policy information indicates that the self-healing operation is to be performed on the NFVI fault.

With reference to the fifth aspect, in a first possible implementation of the fifth aspect, the self-healing policy information includes updated self-healing policy information.

With reference to the fifth aspect or the first possible implementation of the fifth aspect, in a second possible implementation of the fifth aspect, the apparatus further includes: a sending unit, configured to send self-healing start information, where the self-healing start information is used to indicate that the self-healing operation on the NFVI fault is started.

With reference to the second possible implementation of the fifth aspect, in a third possible implementation of the fifth aspect, the sending unit is further configured to send self-healing complete information, where the self-healing complete information is used to indicate that the self-healing operation on the NFVI fault is complete.

With reference to the second or the third possible implementation of the fifth aspect, in a fourth possible implementation of the fifth aspect, the sending unit is further configured to send fault information of the NFVI fault when the self-healing policy information indicates that the self-healing operation on the NFVI fault is forbidden.

With reference to any one of the fifth aspect, or the first to the fourth possible implementations of the fifth aspect, in a fifth possible implementation of the fifth aspect, the self-healing unit is specifically configured to: select a new server for deploying a virtual machine that is affected by the NFVI fault; and create a virtual machine.

With reference to any one of the fifth aspect, or the first to the fifth possible implementations of the fifth aspect, in a sixth possible implementation of the fifth aspect, the self-healing policy information includes a virtual machine identity, fault type information, and self-healing action information, or the self-healing policy information includes a virtual machine identity, a virtual link identity, fault type information, and self-healing action information, where the self-healing action information includes starting self-healing information and/or forbidding self-healing information.

According to a sixth aspect, an apparatus is provided and includes: a determining unit, configured to determine self-healing policy information, where the self-healing policy information is used to indicate whether to perform a self-healing operation on the NFVI fault; and a sending unit, configured to send the self-healing policy information, so that the self-healing operation is performed on the NFVI fault when the self-healing policy information indicates that the self-healing operation is to be performed on the determined network functions virtualization infrastructure NFVI fault.

With reference to the sixth aspect, in a first possible implementation of the sixth aspect, the determining unit is specifically configured to: determine a prestored self-healing policy, where the prestored self-healing policy includes a network functions virtualization VNF self-healing policy and/or a network service NS self-healing policy; and map or convert the prestored self-healing policy to determine the self-healing policy information.

With reference to the first possible implementation of the sixth aspect, in a second possible implementation of the sixth aspect, the apparatus further includes: an updating unit, configured to update the prestored self-healing policy.

With reference to the first possible implementation of the sixth aspect or the second possible implementation of the sixth aspect, in a third possible implementation of the sixth aspect, the VNF self-healing policy includes a VNF identity and/or a VNF component identity, and fault type information and self-healing action information.

With reference to any one of the first to the third possible implementations of the sixth aspect, in a fourth possible implementation of the sixth aspect, the NS self-healing policy includes the VNF self-healing policy and a self-healing policy for virtual links between multiple VNFs, where the self-healing policy for the virtual links includes virtual link identities and self-healing action information.

With reference to any one of the sixth aspect, or the first to the fourth possible implementations of the sixth aspect, in a fifth possible implementation of the sixth aspect, the apparatus further includes a receiving unit configured to receive self-healing start information, where the self-healing start information is used to indicate that the self-healing operation on the NFVI fault is started; and a forbidding unit is configured to forbid, according to the self-healing start information, repeatedly starting the self-healing operation.

With reference to the fifth possible implementation of the sixth aspect, in a sixth possible implementation of the sixth aspect, the receiving unit is further configured to receive self-healing complete information, where the self-healing complete information is used to indicate that the self-healing operation on the NFVI fault is complete.

With reference to any one of the sixth aspect, or the first to the sixth possible implementations of the sixth aspect, in a seventh possible implementation of the sixth aspect, the self-healing policy information includes a virtual machine identity, fault type information, and self-healing action information, or the self-healing policy information includes a virtual machine identity, a virtual link identity, fault type information, and self-healing action information, where the self-healing action information includes starting self-healing information and/or forbidding self-healing information.

According to a seventh aspect, an apparatus is provided and includes: a self-healing unit, configured to perform a self-healing operation on a determined network functions virtualization infrastructure NFVI fault; and a sending unit, configured to send status information of the NFVI fault, where the status information is used to indicate that repeatedly starting the self-healing operation is forbidden.

With reference to the seventh aspect, in a first possible implementation of the seventh aspect, the status information includes self-healing start information, and the self-healing start information is used to indicate that the self-healing operation on the NFVI fault is started.

With reference to the seventh aspect or the first possible implementation of the seventh aspect, in a second possible implementation of the seventh aspect, the sending unit is further configured to send self-healing complete information, where the self-healing complete information is used to indicate that the self-healing operation on the NFVI fault is complete.

With reference to any one of the seventh aspect, or the first to the second possible implementations of the seventh aspect, in a third possible implementation of the seventh aspect, the self-healing unit is specifically configured to: select a new server for deploying a virtual machine that is affected by the NFVI fault; and create a virtual machine.

According to an eighth aspect, an apparatus is provided and includes: an obtaining unit, configured to obtain status information of a network functions virtualization infrastructure NFVI fault, where the status information is used to indicate that repeatedly starting a self-healing operation is forbidden; and a forbidding unit, configured to forbid, according to the status information, repeatedly starting the self-healing operation.

With reference to the eighth aspect, in a first possible implementation of the eighth aspect, the status information includes self-healing start information, and the self-healing start information is used to indicate that the self-healing operation on the NFVI fault is started.

With reference to the eighth aspect or the first possible implementation of the eighth aspect, in a second possible implementation of the eighth aspect, the obtaining unit is further configured to obtain self-healing complete information, where the self-healing complete information is used to indicate that the self-healing operation on the NFVI fault is complete.

In the embodiments of the present invention, because an infrastructure fault itself is a root-cause fault, no fault analysis is required. Therefore, after a network functions virtualization infrastructure fault is determined, determining can be performed according to obtained self-healing policy information that indicates whether to perform a self-healing operation on the network functions virtualization infrastructure fault. When the self-healing policy information indicates that the self-healing operation is to be performed, the determined fault can be self-healed in time. Therefore, in the embodiments of the present invention, time for reporting and making a fault analysis for the infrastructure fault can be saved, the infrastructure fault is rectified as quickly as possible, a fault processing delay is reduced, and system performance can be improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
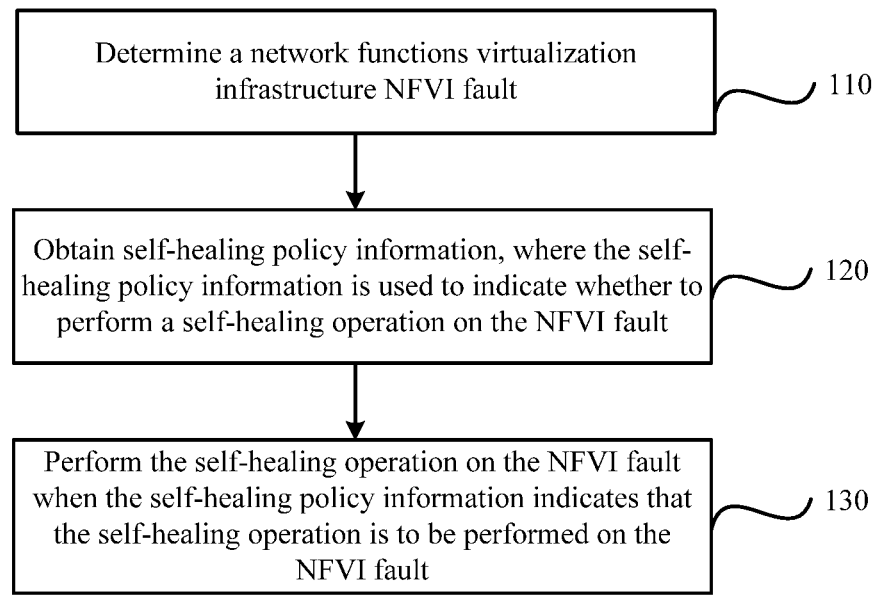
FIG. 1 is a flowchart of a network functions virtualization based fault processing method according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, NFV includes three key features. 1. Software that defines network functions is completely separated from universal high-performance hardware servers, storages, and network switches. 2. Modular features of software are independent of modular features of hardware. 3. Orchestration is automatic, that is, based on universal hardware, software is remotely installed and managed in a completely automatic manner.

A network functions virtualization orchestrator (NFVO) implements network service descriptor (NSD) and virtualized network function forwarding graph (VNFFG) management and processing, and network service lifecycle management, and works with a virtualized network function manager (VNFM) to implement VNF lifecycle management and global resource view functions.

The VNFM implements VNF lifecycle management, including virtualized network function descriptor (VNFD) management and processing, VNF instantiation, VNF expansion/contraction, and VNF instance termination.

A virtualized infrastructure manager (VIM) is mainly responsible for managing hardware resources at an infrastructure layer and virtualized resources, performing monitoring and fault reporting, and providing a virtualized resource pool oriented to an upper-layer application.

An NFVI includes hardware resources, virtual resources, and a virtualization layer. From a perspective of a VNF, the virtualization layer and the hardware resources look like an entity that can provide required virtual resources.

An NFVI fault processing process may be as follows:

(1) After an NFVI fault occurs, the VIM reports the fault to the VNFM/NFVO.

(2) The VNFM/NFVO performs fault correlation, and makes a fault processing decision.

(3) The VNFM/NFVO sends a fault rectification instruction to the VIM.

(4) According to the fault rectification instruction, the VIM performs fault rectification or fault self-healing, for example, VM migration or VM creation.

From detection of an NFV fault to fault rectification, there is an analysis and processing delay, so that a fault decision entity can make a correct decision. However, an NFVI fault is different from a VNF fault. The VNF fault may be caused by another fault. The infrastructure fault itself is a root-cause fault, and does not need a root cause analysis and decision. Therefore, in a method for processing an infrastructure fault in the prior art, a processing delay is long.

In addition, when the infrastructure fault (for example, a hardware fault or a virtual machine fault) occurs, the virtualized infrastructure manager (VIM) can trigger, by itself, some self-healing operations on the fault. However, when a hardware fault or a virtual machine fault occurs, a VNF fault is also triggered. In addition, the virtualized network function manager (VNFM) or the network functions virtualization orchestrator NFVO) sends, through the VIM, a request for starting a new VM to trigger a VNF self-healing operation. Therefore, the self-healing operation triggered by the NFVO or the VNFM and the self-healing operation triggered by the VIM may cause a conflict.

FIG. 1 is a flowchart of a network functions virtualization based fault processing method according to an embodiment of the present invention. The method 100 shown in FIG. 1 may be performed by a virtualized infrastructure manager VIM. The method 100 includes the following steps.

110. Determine a network functions virtualization infrastructure NFVI fault.

120. Obtain self-healing policy information, where the self-healing policy information is used to indicate whether to perform a self-healing operation on the NFVI fault.

130. Perform the self-healing operation on the NFVI fault when the self-healing policy information indicates that the self-healing operation is to be performed on the NFVI fault.

In this embodiment of the present invention, because an infrastructure fault itself is a root-cause fault, no fault analysis is required. Therefore, after a network functions virtualization infrastructure fault is determined, determining can be performed according to obtained self-healing policy information that indicates whether to perform a self-healing operation on the network functions virtualization infrastructure fault. When the self-healing policy information indicates that the self-healing operation is to be performed, the determined fault can be self-healed in time. Therefore, in this embodiment of the present invention, time for reporting and making a fault analysis for the infrastructure fault can be saved, the infrastructure fault is rectified as quickly as possible, a fault processing delay is reduced, and system performance can be improved.

It should be understood that, NFV faults may include NFVI faults, VNF faults, network faults, and the like. The NFVI faults may include hardware faults (for example, a hard disk input/output fault, a server power outage, and a port fault) and VM faults. The VNF faults may be VNF software faults. An NFVI fault may be passed to a VNF and cause a VNF fault.

The VIM can perform a health check on an NFVI to detect and determine an NFVI fault in time. The health check may be implemented by means of a heartbeat packet, a watchdog, or the like in the prior art. A manner of determining the NFVI fault by the VIM is not limited in this embodiment of the present invention.

The obtained self-healing policy information may be used to indicate, to the VIM, whether to perform self-healing on the detected NFVI fault. That is, the self-healing policy information may indicate, to the VIM, that the self-healing operation is to be started, or may indicate, to the VIM, that the self-healing operation is forbidden.

Optionally, in another embodiment, the self-healing policy information may be obtained after a prestored self-healing policy is mapped or converted. The prestored self-healing policy may be statically prestored in a VNFD, or may be described in an NSD. A network operator may also define the self-healing policy in an NFVO. After the self-healing policy is mapped or converted, the self-healing policy information that can be recognized by the VIM is obtained, and then is sent by the NFVO or a VNFM to the corresponding VIM when VNF instantiation is complete. In this way, when the VIM detects the NFVI fault, the VIM can automatically trigger the self-healing operation on the NFVI fault according to the self-healing policy information. It should be understood that, the VNFM and the NFVO can recognize a VNF and deploy a VM corresponding to the VNF. However, the VIM can only recognize the VM, but cannot determine which VNF specifically corresponds to the VM. Therefore, the VNFM and/or the NFVO need/needs to map or convert the self-healing policy to the self-healing policy information. The self-healing policy information includes self-healing policy information for a VM corresponding to a VNF instance and self-healing policy information for internal VLs between VMs.

Specifically, the self-healing policy defined in the VNFD may include a VNF self-healing policy, namely, a self-healing policy for a VNF or a type of VNF. The self-healing policy defined in the NSD may include an NS self-healing policy, namely, a self-healing policy for an NS or a type of NS. The NS self-healing policy may include a self-healing policy for multiple VNFs that constitute an NS and a self-healing policy for external virtual links (VL) between the VNFs. The self-healing policy defined in the NSD may include a self-healing policy for VNFs that constitute a network service (NS) and a self-healing policy for VNFFGs or virtual links that constitute the NS.

When a VNF includes multiple VNF components (VNFC), the VNF self-healing policy defined in the VNFD may include a self-healing policy for multiple different VNFCs and a self-healing policy for VLs between the VNFCs. When a VNF includes only one VNFC, a self-healing policy for the VNF may include a self-healing policy for the VNFC only.

When the self-healing policy information obtained after the mapping or conversion indicates, to the VIM, that the self-healing operation is to be performed on the NFVI fault, the VIM performs the self-healing operation. It should be understood that, the self-healing operation may be the same as a conventional self-healing process. This embodiment of the present invention does not limit how the VIM performs self-healing on the detected NFVI fault.

Optionally, in another embodiment, the self-healing policy information may include updated self-healing policy information.

Specifically, the NFVO or the VNFM may update the self-healing policy according to a requirement. In other words, an updated self-healing policy may be mapped or converted, and updated self-healing policy information may be obtained.

Figure 2:
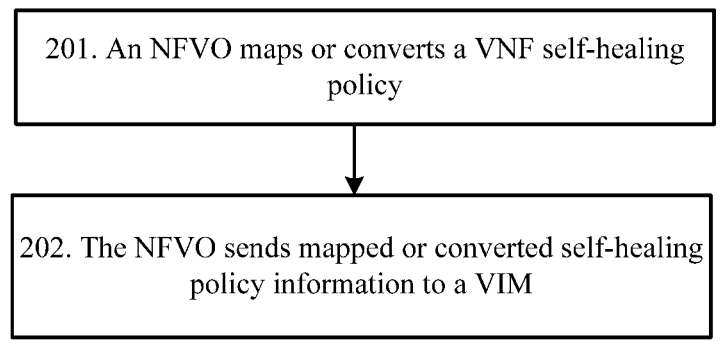
FIG. 2 is a schematic flowchart of a process of obtaining self-healing policy information according to an embodiment of the present invention.
Figure 3:
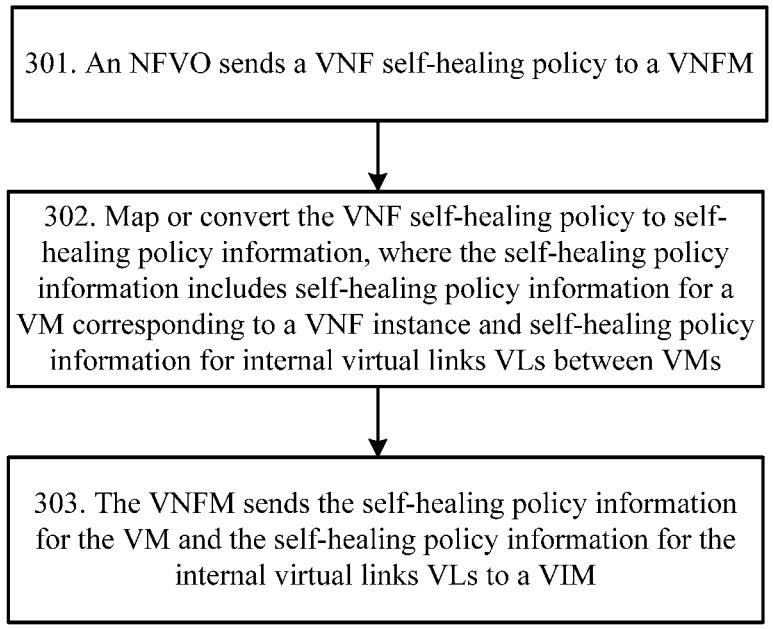
FIG. 3 is a schematic flowchart of a process of obtaining self-healing policy information according to an embodiment of the present invention.
Figure 4:
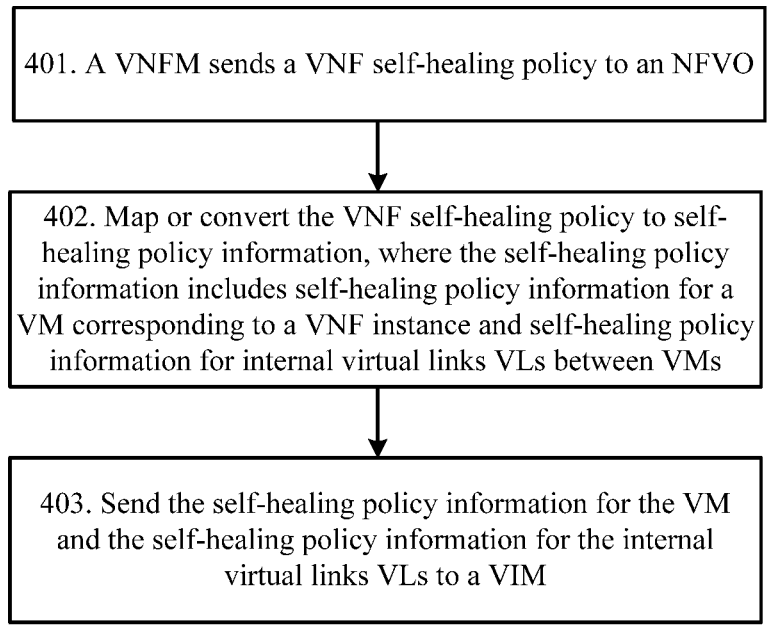
FIG. 4 is a schematic flowchart of a process of obtaining self-healing policy information according to another embodiment of the present invention.

With reference to FIG. 2 to FIG. 4, the following describes in detail a process of obtaining self-healing policy information.

FIG. 2 is a schematic flowchart of a process of obtaining self-healing policy information according to an embodiment of the present invention. The process 200 includes the following steps.

201. An NFVO maps or converts a VNF self-healing policy.

The NFVO maps or converts the VNF self-healing policy to self-healing policy information. The self-healing policy information may include self-healing policy information for a VM corresponding to a VNF instance and self-healing policy information for internal virtual links VLs between VMs.

It should be understood that, a VNFM and the NFVO can recognize a VNF and deploy a VM corresponding to the VNF. However, a VIM can only recognize the VM, but cannot determine which VNF specifically corresponds to the VM. Therefore, before the VNFM and/or the NFVO send/sends the self-healing policy information to the VIM, the VNF self-healing policy needs to be mapped or converted to the self-healing policy information for the VM corresponding to the VNF instance and the self-healing policy information for the internal VLs between the VMs.

The VNF self-healing policy may be mapped or converted to self-healing policy information for one or more VMs. When a VNF is deployed on one VM, the VNF self-healing policy may be mapped or converted to self-healing policy information for the one VM. When a VNF is deployed on multiple VMs, the VNF self-healing policy may be mapped or converted to self-healing policy information for the multiple VMs and self-healing policy information for internal VLs between the VMs.

202. The NFVO sends mapped or converted self-healing policy information to a VIM.

The VNF self-healing policy may be defined in the NFVO by an operator, or a default VNF self-healing policy may be stored in a VNFD.

The process shown in FIG. 2 may include the following two embodiments.

Optionally, in an embodiment, the operator may define the VNF self-healing policy in the NFVO. After VNF instantiation is complete, the NFVO maps or converts the VNF self-healing policy, and then the NFVO directly sends the mapped or converted self-healing policy information to the VIM.

Optionally, in another embodiment, the default VNF self-healing policy may exist in the VNFD. After VNF instantiation is complete, the NFVO maps or converts the VNF self-healing policy, and then the NFVO directly sends the mapped or converted self-healing policy information to the VIM.

FIG. 3 is a schematic flowchart of a process of obtaining self-healing policy information according to an embodiment of the present invention. In this embodiment of the present invention, a VIM may obtain self-healing policy information. The process 300 includes the following steps.

301. An NFVO sends a VNF self-healing policy to a VNFM.

302. Map or convert the VNF self-healing policy to self-healing policy information, where the self-healing policy information includes self-healing policy information for a VM corresponding to a VNF instance and self-healing policy information for internal virtual links VLs between VMs.

The VNF self-healing policy may be mapped or converted to self-healing policy information for one or more VMs. When a VNF is deployed on one VM, the VNF self-healing policy may be mapped or converted to self-healing policy information for the one VM. When a VNF is deployed on multiple VMs, the VNF self-healing policy may be mapped or converted to self-healing policy information for the multiple VMs and self-healing policy information for VLs between the VMs.

Optionally, the mapping or conversion process may be performed by the VNFM, or may be performed by the NFVO. This embodiment of the present invention is not limited thereto.

303. The VNFM sends the self-healing policy information for the VM and the self-healing policy information for the internal virtual links VLs to a VIM.

Optionally, the VNF self-healing policy may be defined in the NFVO by an operator, or a default VNF self-healing policy may be stored in a VNFD.

It should be understood that, the process shown in FIG. 3 may include the following four embodiments.

Optionally, in an embodiment, in FIG. 3, the operator may define the VNF self-healing policy in the NFVO. During VNF instantiation or after instantiation is complete, the NFVO sends the VNF self-healing policy to the VNFM. After VNF instantiation is complete, the VNFM maps or converts the received VNF self-healing policy, and then the VNFM sends the mapped or converted self-healing policy information to the VIM.

Optionally, in another embodiment, the operator may define the VNF self-healing policy in the NFVO. After VNF instantiation is complete, the NFVO maps or converts the VNF self-healing policy, and then the NFVO sends the mapped or converted self-healing policy information to the VNFM. Then the VNFM sends the mapped or converted self-healing policy information to the VIM.

Optionally, in another embodiment, in FIG. 3, the default VNF self-healing policy may exist in the VNFD. The NFVO obtains the VNF self-healing policy from the VNFD. During VNF instantiation or after instantiation is complete, the NFVO sends the VNF self-healing policy to the VNFM. After VNF instantiation is complete, the VNFM maps or converts the received VNF self-healing policy, and then the VNFM sends the mapped or converted self-healing policy information to the VIM.

Optionally, in another embodiment, the default VNF self-healing policy may exist in the VNFD. The NFVO obtains the VNF self-healing policy from the VNFD. After VNF instantiation is complete, the NFVO maps or converts the VNF self-healing policy, and then the NFVO sends the mapped or converted self-healing policy information to the VNFM. Then the VNFM sends the mapped or converted self-healing policy information to the VIM.

FIG. 4 is a schematic flowchart of a process of obtaining self-healing policy information according to another embodiment of the present invention. In this embodiment of the present invention, a VIM may obtain self-healing policy information. The process 400 includes the following steps.

401. A VNFM sends a VNF self-healing policy to an NFVO.

402. Map or convert the VNF self-healing policy to self-healing policy information, where the self-healing policy information includes self-healing policy information for a VM corresponding to a VNF instance and self-healing policy information for internal virtual links VLs between VMs.

The VNF self-healing policy may be mapped or converted to self-healing policy information for one or more VMs. When a VNF is deployed on one VM, the VNF self-healing policy may be mapped or converted to self-healing policy information for the one VM. When a VNF is deployed on multiple VMs, the VNF self-healing policy may be mapped or converted to self-healing policy information for the multiple VMs and self-healing policy information for VLs between the VMs.

Optionally, the mapping or conversion process may be performed by the VNFM, or may be performed by the NFVO. This embodiment of the present invention is not limited thereto.

403. Send the self-healing policy information for the VM and the self-healing policy information for the internal virtual links VLs to a VIM.

The VNF self-healing policy may be defined in the VNFM by an operator, or a default VNF self-healing policy may be stored in a VNFD. In step 403, the self-healing policy information may be sent by the NFVO, or may be sent by the VNFM.

It should be understood that, the process shown in FIG. 4 may include the following four embodiments.

Optionally, in an embodiment, in FIG. 4, the operator may define the VNF self-healing policy in the VNFM. During VNF instantiation or after instantiation is complete, the VNFM sends the VNF self-healing policy to the NFVO. After VNF instantiation is complete, the NFVO maps or converts the received VNF self-healing policy, and then the NFVO sends the mapped or converted self-healing policy information to the VIM.

Optionally, in another embodiment, the operator may define the VNF self-healing policy in the VNFM. After VNF instantiation is complete, the VNFM maps or converts the VNF self-healing policy, and then the VNFM sends the mapped or converted self-healing policy information to the NFVO. Then the NFVO sends the mapped or converted self-healing policy information to the VIM.

Optionally, in another embodiment, in FIG. 4, the default VNF self-healing policy may exist in the VNFD. The VNFM obtains the VNF self-healing policy from the VNFD. During VNF instantiation or after instantiation is complete, the VNFM sends the VNF self-healing policy to the NFVO. After VNF instantiation is complete, the NFVO maps or converts the received VNF self-healing policy, and then the NFVO sends the mapped or converted self-healing policy information to the VIM.

Optionally, in another embodiment, the default VNF self-healing policy may exist in the VNFD. The VNFM obtains the VNF self-healing policy from the VNFD. After VNF instantiation is complete, the VNFM maps or converts the VNF self-healing policy, and then the VNFM sends the mapped or converted self-healing policy information to the NFVO. Then the NFVO sends the mapped or converted self-healing policy information to the VIM.

It should be understood that, in this embodiment of the present invention, the VNFM may further send the mapped or converted self-healing policy information to the VIM directly without using the NFVO. Details are as follows:

Optionally, in another embodiment, the operator may define the VNF self-healing policy in the VNFM. After VNF instantiation is complete, the VNFM maps or converts the VNF self-healing policy, and then the VNFM directly sends the mapped or converted self-healing policy information to the VIM.

Optionally, in another embodiment, the default VNF self-healing policy may exist in the VNFD. After VNF instantiation is complete, the VNFM maps or converts the VNF self-healing policy, and then the VNFM directly sends the mapped or converted self-healing policy information to the VIM.

Figure 5:
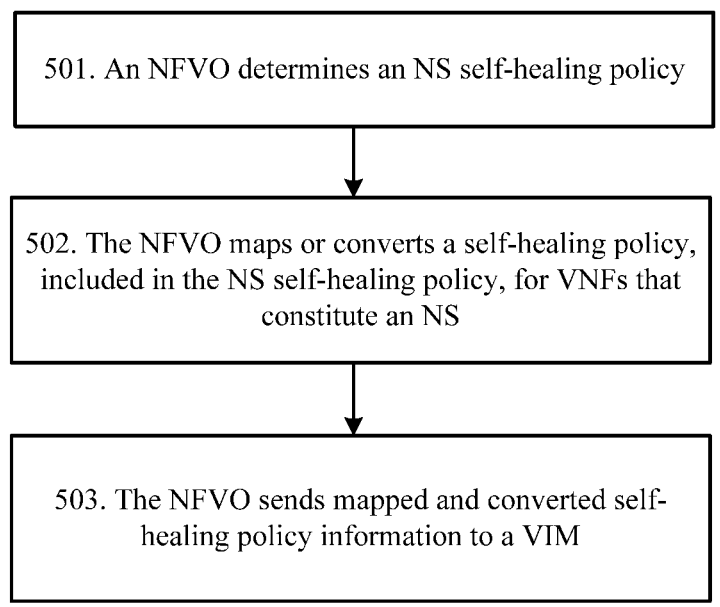
FIG. 5 is a schematic flowchart of a process of obtaining self-healing policy information according to another embodiment of the present invention.

FIG. 5 is a schematic flowchart of a process of obtaining self-healing policy information according to another embodiment of the present invention. In this embodiment of the present invention, a VIM may obtain self-healing policy information. The process 500 includes the following steps.

501. An NFVO determines an NS self-healing policy.

Specifically, the NFVO may obtain the NS self-healing policy from an NSD, or an operator may predefine the NS self-healing policy in the NFVO.

The NS self-healing policy may include a self-healing policy for multiple VNFs that constitute an NS and a self-healing policy for external virtual links between the VNFs.

502. The NFVO maps or converts a self-healing policy, included in the NS self-healing policy, for VNFs that constitute an NS.

Specifically, the NFVO maps or converts the VNF self-healing policy in the NS self-healing policy to self-healing policy information for a VM corresponding to a VNF instance and self-healing policy information for internal virtual links VLs between VMs.

The VNF self-healing policy may be mapped or converted to self-healing policy information for one or more VMs. When a VNF is deployed on one VM, the VNF self-healing policy may be mapped or converted to self-healing policy information for the one VM. When a VNF is deployed on multiple VMs, the VNF self-healing policy may be mapped or converted to self-healing policy information for the multiple VMs and self-healing policy information for internal VLs between the VMs.

Optionally, when the NS includes multiple VNFs, the NFVO may map or convert the self-healing policy, included in the obtained NS self-healing policy, for external VLs that constitute the NS, to self-healing policy information for VLs between VMs corresponding to multiple VNF instances that constitute the NS.

503. The NFVO sends mapped and converted self-healing policy information to a VIM.

The process shown in FIG. 5 may include the following embodiments.

Optionally, in an embodiment, in FIG. 5, a default self-healing policy may exist in the NSD. After the NFVO obtains the self-healing policy from the NSD, and after NS instantiation is complete, the NFVO maps or converts the NS self-healing policy obtained from the NSD. Then the NFVO directly sends the mapped or converted self-healing policy information to the VIM.

Optionally, in another embodiment, the operator may predefine the NS self-healing policy in the NFVO. After NS instantiation is complete, the NFVO maps or converts the NS self-healing policy obtained from the NSD, and then the NFVO directly sends the mapped or converted self-healing policy information to the VIM.

Figure 6:
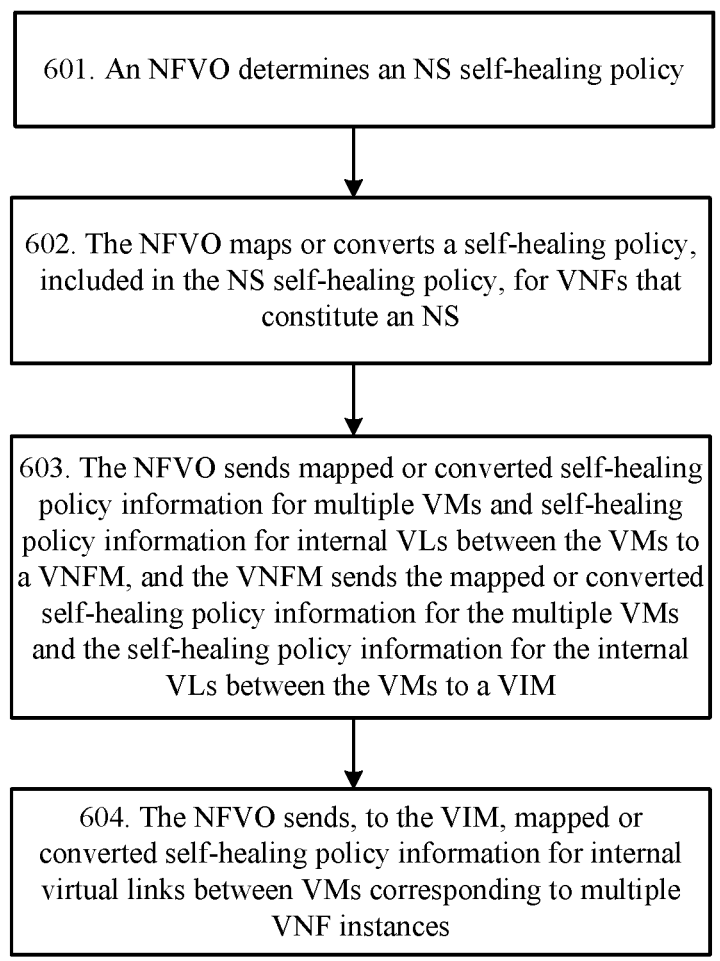
FIG. 6 is a schematic flowchart of a process of obtaining self-healing policy information according to another embodiment of the present invention.

FIG. 6 is a schematic flowchart of a process of obtaining self-healing policy information according to another embodiment of the present invention. In this embodiment of the present invention, a VIM may obtain self-healing policy information. The process 600 includes the following steps.

601. An NFVO determines an NS self-healing policy.

Specifically, the NFVO may obtain the NS self-healing policy from an NSD, or an operator may predefine the NS self-healing policy in the NFVO.

The NS self-healing policy may include a self-healing policy for multiple VNFs that constitute an NS and a self-healing policy for external virtual links between the VNFs.

602. The NFVO maps or converts a self-healing policy, included in the NS self-healing policy, for VNFs that constitute an NS.

Specifically, the NFVO maps or converts the VNF self-healing policy in the NS self-healing policy to self-healing policy information for a VM corresponding to a VNF instance and self-healing policy information for internal virtual links VLs between VMs.

The VNF self-healing policy may be mapped or converted to self-healing policy information for one or more VMs. When a VNF is deployed on one VM, the VNF self-healing policy may be mapped or converted to self-healing policy information for the one VM. When a VNF is deployed on multiple VMs, the VNF self-healing policy may be mapped or converted to self-healing policy information for the multiple VMs and self-healing policy information for VLs between the VMs.

Optionally, when the NS includes multiple VNFs, the NFVO may map or convert the self-healing policy, included in the obtained NS self-healing policy, for external VLs that constitute the NS, to self-healing policy information for VLs between VMs corresponding to multiple VNF instances that constitute the NS.

603. The NFVO sends mapped or converted self-healing policy information for multiple VMs and self-healing policy information for VLs between the VMs to a VNFM, and the VNFM sends the mapped or converted self-healing policy information for the multiple VMs and the self-healing policy information for the VLs between the VMs to a VIM.

604. The NFVO sends, to the VIM, mapped or converted self-healing policy information for virtual links between VMs corresponding to multiple VNF instances that constitute the NS.

It should be understood that, a sequence between steps 603 and 604 is not limited in this embodiment of the present invention.

Figure 7:
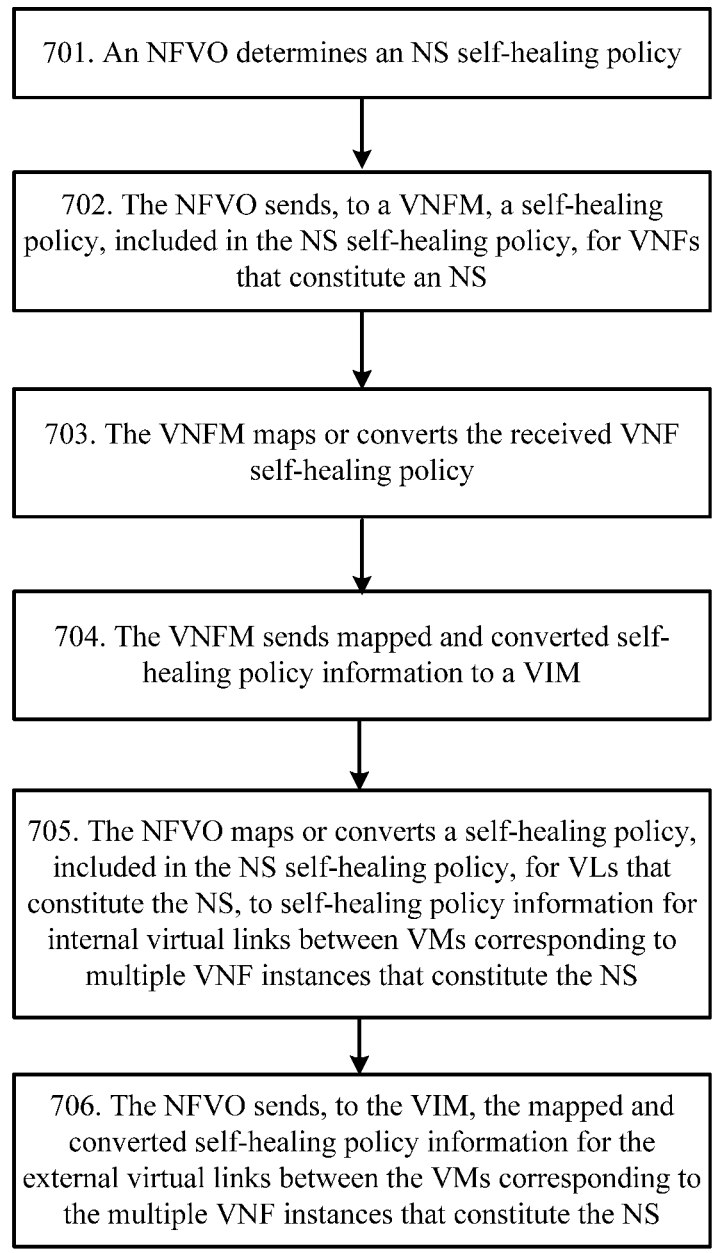
FIG. 7 is a schematic flowchart of a process of obtaining self-healing policy information according to another embodiment of the present invention.

FIG. 7 is a schematic flowchart of a process of obtaining self-healing policy information according to another embodiment of the present invention. In this embodiment of the present invention, a VIM may obtain self-healing policy information. The process 700 includes the following steps.

701. An NFVO determines an NS self-healing policy.

Specifically, the NFVO may obtain the NS self-healing policy from an NSD, or an operator may predefine the NS self-healing policy in the NFVO.

The NS self-healing policy may include a self-healing policy for multiple VNFs that constitute an NS and a self-healing policy for external virtual links between the VNFs.

702. The NFVO sends, to a VNFM, a self-healing policy, included in the NS self-healing policy, for VNFs that constitute an NS.

703. The VNFM maps or converts the received VNF self-healing policy.

Specifically, the VNFM maps or converts the received VNF self-healing policy to self-healing policy information for a VM corresponding to a VNF instance and self-healing policy information for internal virtual links VLs between VMs.

The VNF self-healing policy may be mapped or converted to self-healing policy information for one or more VMs. When a VNF is deployed on one VM, the VNF self-healing policy may be mapped or converted to self-healing policy information for the one VM. When a VNF is deployed on multiple VMs, the VNF self-healing policy may be mapped or converted to self-healing policy information for the multiple VMs and self-healing policy information for VLs between the VMs.

704. The VNFM sends mapped and converted self-healing policy information to a VIM.

705. The NFVO maps or converts a self-healing policy, included in the NS self-healing policy, for VLs that constitute the NS, to self-healing policy information for virtual links between VMs corresponding to multiple VNF instances that constitute the NS.

706. The NFVO sends, to the VIM, the mapped and converted self-healing policy information for the virtual links between the VMs corresponding to the multiple VNF instances that constitute the NS.

It should be understood that, a sequence between step 702 and (steps 705 and 706) is not limited in this embodiment of the present invention.

The foregoing describes in detail the process of obtaining the self-healing policy information. The following describes in detail the self-healing policy information and specific content included in the self-healing policy.

Optionally, in another embodiment, the VNF self-healing policy may include a virtualized network function VNF identity, fault type information, and self-healing action information. The self-healing action information includes starting self-healing information and/or forbidding self-healing information.

When a VNF includes multiple VNF components (VNFC), a VNF self-healing policy defined in a VNFD may include a self-healing policy for multiple different VNFCs and a self-healing policy for VLs between the VNFCs. When a VNF includes only one VNFC, a self-healing policy for the VNF may include a self-healing policy for the VNFC only.

Specifically, a VNF identity in the VNF self-healing policy defined in the VNFD may be identity information (ID) of a VNF defined by a VNF vendor. A VNF identity defined by the operator may be a unique identity of a VNF in a management domain of the operator, or a type of VNF (for example, an MME) may be specified. The fault type information may include a hardware fault (for example, a hard disk input/output fault), a server power outage, a host operating system fault, a port fault, or the like. The self-healing action information may include starting self-healing information and/or forbidding self-healing information. The starting self-healing information may instruct the VIM to automatically trigger the self-healing operation. The forbidding self-healing information may instruct the VIM to forbid automatically triggering the self-healing operation.

The VNF self-healing policy defined by the operator or the VNF self-healing policy defined in the VNFD may be shown in Table 1.

TABLE 1

| VNF self-healing policy | | |
|---|---|---|
| VNF/VNFC ID | Fault type information | Self-healing action information |
| VNF ID 1 | Hardware fault | Start |
| VNFC ID 1 | Server power outage | Start |
| VNFC ID 2 | Port fault | Forbid |
| . . . | . . . | . . . |

As can be learned from Table 1, for example, when a VNF ID 1 is an identity of a VNF, and a type of a fault that occurs on the VNF is a hardware fault, and a corresponding self-healing action is start, that is, when the fault occurs on the VNF whose ID is 1, and the type of the fault of the VNF is a hardware fault, the VIM may start a self-healing operation. It should be understood that, Table 1 merely shows a self-healing policy including some VNFs. The self-healing policy may further include other VNFs that are not listed exhaustively in this embodiment of the present invention. It should also be understood that, the VIM may detect multiple faults simultaneously, and then find, according to identities in Table 1, fault processing methods corresponding to the identities, that is, self-healing action information. Optionally, the method for defining the self-healing policy is not limited in this embodiment of the present invention, provided that the self-healing policy can indicate whether to perform self-healing on the NVFI fault.

Optionally, in another embodiment, the NS self-healing policy may include a VNF self-healing policy and a self-healing policy for VLs between multiple VNFs that constitute an NS.

The self-healing policy for the VLs (including internal or external VLs of the VNFs) may include virtual link VL identities and self-healing action information, as shown in Table 2. The self-healing action information may include starting self-healing information and/or forbidding self-healing information. For an internal VL of a VNF, a VL identity can identify a VL between two specific VNFCs in a specific VNF. For an external VL between VNFs, a VL identity can identify a VL between two specific VNFs.

TABLE 2

Self-healing policy for VLs

| VL ID | Self-healing action information |
|---|---|
| VL ID 1 | Start |
| VL ID 2 | Start |
| VL ID 3 | Forbid |
| ... | ... |

Optionally, in another embodiment, the NS self-healing policy defined in the NSD may include an NS identity and self-healing action information, where the self-healing action information may include starting self-healing information and/or forbidding self-healing information, as shown in the following Table 3.

It should be understood that, when the NS includes one VNF, the NS self-healing policy may include a self-healing policy for the VNF; when the NS includes multiple VNFs, the NS self-healing policy includes a self-healing policy for the multiple VNFs and a self-healing policy for external VLs between the VNFs.

TABLE 3

NS self-healing policy

| NS ID | Self-healing action information |
|---|---|
| NS ID 1 | Start |
| NS ID 2 | Start |
| NS ID 3 | Forbid |
| ... | ... |

Optionally, in another embodiment, the self-healing policy information may include a virtual machine identity, fault type information, and self-healing action information, or the self-healing policy information includes a virtual machine identity, a virtual link identity, fault type information, and self-healing action information, where the self-healing action information includes starting self-healing information and/or forbidding self-healing information.

Optionally, in another embodiment, the self-healing policy information mapped and converted from the VNF self-healing policy and/or the NS self-healing policy may include a virtual machine VM identity, fault type information, and self-healing action information, as shown in the following Table 4. The self-healing action information may include starting self-healing information and/or forbidding self-healing information.

TABLE 4

Mapped or converted self-healing policy information

| VM ID | Fault type information | Self-healing action information |
|---|---|---|
| VM ID 1 | Hardware fault | Start |
| VM ID 2 | Server power outage | Start |
| VM ID 3 | Port fault | Forbid |
| ... | ... | ... |

Optionally, in another embodiment, the self-healing policy information mapped or converted from the self-healing policy for the VLs (internal or external VLs of VNFs) may include VL identities and self-healing action information. The self-healing action information may include starting self-healing information and/or forbidding self-healing information. A VL identity can identify a VL between two specific VMs.

Figure 8:
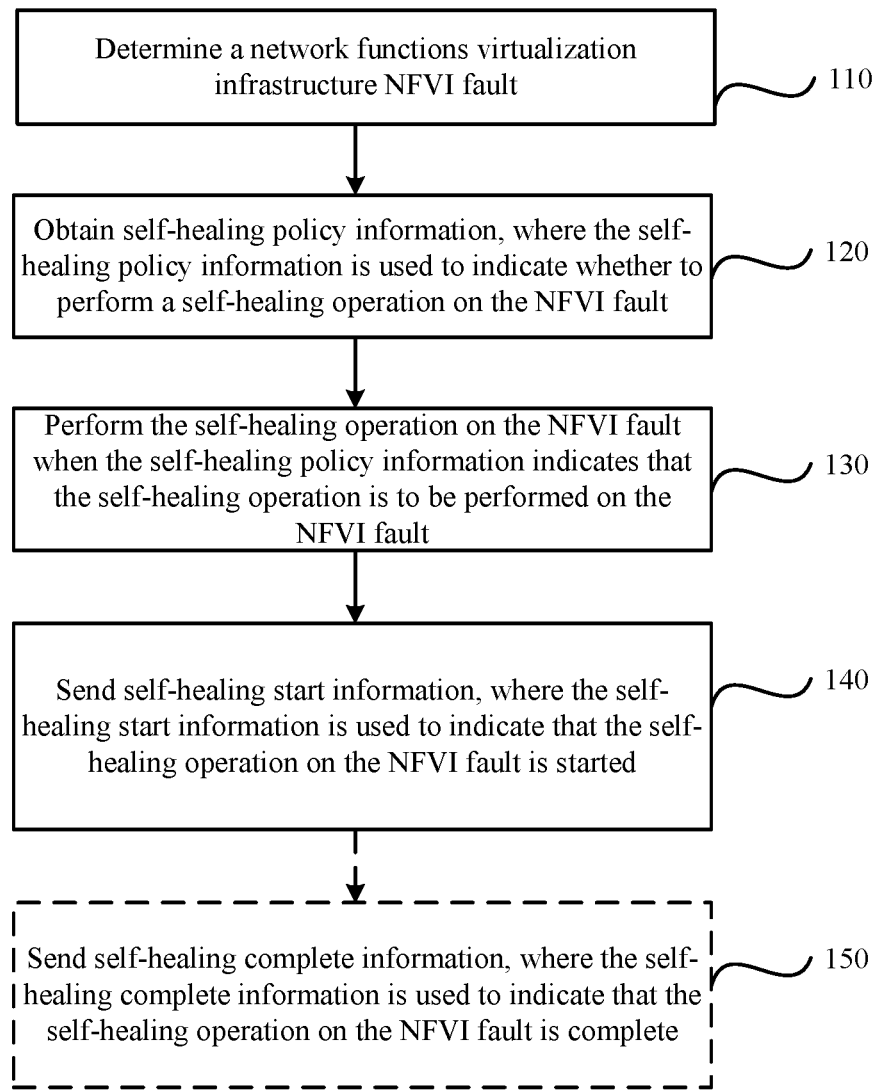
FIG. 8 is a schematic flowchart of a network functions virtualization based fault processing method according to another embodiment of the present invention.

FIG. 8 is a schematic flowchart of a network functions virtualization based fault processing method according to another embodiment of the present invention. When self-healing policy information indicates that a self-healing operation is to be performed on an NFVI fault, after a VIM performs the self-healing operation, the method 100 may further include:

140. Send self-healing start information, where the self-healing start information is used to indicate that the self-healing operation on the NFVI fault is started.

In this embodiment of the present invention, because an infrastructure fault itself is a root-cause fault, no fault analysis is required. Therefore, after a network functions virtualization infrastructure fault is determined, determining can be performed according to obtained self-healing policy information that indicates whether to perform a self-healing operation on the NFVI fault. When the self-healing policy information indicates that the self-healing operation is to be performed, the determined fault can be self-healed in time. Therefore, in this embodiment of the present invention, time for reporting and making a fault analysis for the infrastructure fault can be saved, the infrastructure fault is rectified as quickly as possible, a fault processing delay is reduced, and system performance can be improved.

In addition, in this embodiment of the present invention, self-healing start information that can indicate that the self-healing operation on the NFVI fault is started is sent. In this way, after receiving the self-healing start information, a receiver does not repeatedly start the self-healing operation, and therefore, a conflict that may be caused by repeatedly started self-healing operations is avoided.

It should be understood that, the receiver of the self-healing start information may be a VNFM and/or an NFVO.

Optionally, in another embodiment, the VIM may send the self-healing start information to the NFVO and/or the VNFM.

Optionally, in another embodiment, when sending the self-healing start information to the NFVO and/or the VNFM, the VIM may further send fault information of the NFVI fault to the NFVO and/or the VNFM.

Optionally, in another embodiment, after the sending self-healing start information, the method 100 may further include:

150. Send self-healing complete information, where the self-healing complete information is used to indicate that the self-healing operation on the NFVI fault is complete.

Specifically, after the self-healing operation is complete, the VIM may send the self-healing complete information to the NFVO and/or the VNFM. In this way, after receiving the self-healing complete information, the NFVO and/or the VNFM may trigger a reconfiguration of a recovered VM or VNF. It should be understood that, the self-healing start information in step 140 is used as indication information to notify the NFVO and/or the VNFM that the VIM is performing the self-healing operation on the NFVI fault and that a self-healing operation on a VNF fault caused by the NVFI fault is forbidden.

Optionally, in another embodiment, the self-healing start information in this embodiment of the present invention may not be sent, and only the self-healing complete information is sent; or the self-healing complete information may be sent after the self-healing start information is sent. In this way, after the NFVO and/or the VNFM receive/receives the self-healing complete information, the reconfiguration of the recovered VM or VNF may be triggered. Optionally, in another embodiment, when the self-healing policy information indicates that the self-healing operation on the NFVI fault is forbidden, the VIM may report the fault information of the NFVI fault to the NFVO and/or the VNFM. In this case, a subsequent operation may be the same as an operation performed after the VIM reports the fault information in the prior art. A process performed after the VIM reports the fault information is not limited in this embodiment of the present invention.

Optionally, in another embodiment, before the VIM determines, according to the self-healing policy information, whether to perform the self-healing operation on the NFVI fault, the VIM may further perform a health check on an NFVI to detect the NFVI fault and determine a virtual machine affected by the NFVI fault. In addition, the VIM may further view the self-healing policy information.

Optionally, in another embodiment, when the self-healing policy information indicates that the self-healing operation is to be performed on the NFVI fault, the self-healing operation is performed, and the self-healing operation process may include:

selecting a new server for deploying a virtual machine that is affected by the NFVI fault; and creating a virtual machine.

It should be understood that, when the VIM creates the virtual machine, if the fault is not a storage resource fault or a network fault, the created virtual machine may continue to use previous storage resources and network resources. It should also be understood that, when the VIM completes creation of the virtual machine, the VIM completes the self-healing operation. The VIM may send the self-healing complete information to the NFVO and/or the VNFM. The VNFM and/or an element management system (EMS) may perform a service-related configuration for the new VM.

Figure 9:
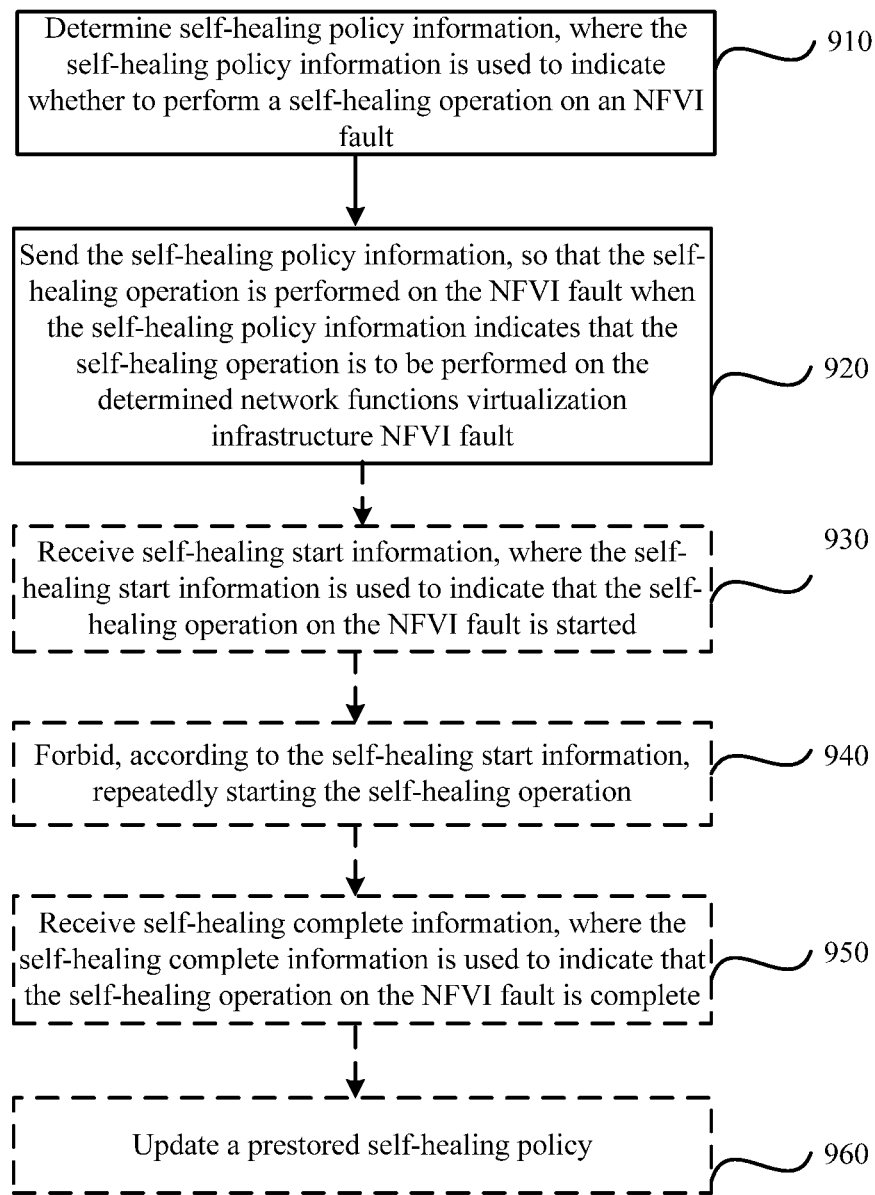
FIG. 9 is a schematic flowchart of a network functions virtualization based fault processing method according to another embodiment of the present invention.

FIG. 9 is a schematic flowchart of a network functions virtualization based fault processing method according to another embodiment of the present invention. The method shown in FIG. 9 may be performed by an NFVO and/or a VNFM. The method includes the following steps.

910. Determine self-healing policy information, where the self-healing policy information is used to indicate whether to perform a self-healing operation on an NFVI fault.

920. Send the self-healing policy information, so that the self-healing operation is performed on the NFVI fault when the self-healing policy information indicates that the self-healing operation is to be performed on the determined network functions virtualization infrastructure NFVI fault.

In this embodiment of the present invention, because an infrastructure fault itself is a root-cause fault, no fault analysis is required. Therefore, after a network functions virtualization infrastructure fault is determined, determining can be performed according to obtained self-healing policy information that indicates whether to perform a self-healing operation on the NFVI fault. When the self-healing policy information indicates that the self-healing operation is to be performed, the determined fault can be self-healed in time. Therefore, in this embodiment of the present invention, time for reporting and making a fault analysis for the infrastructure fault can be saved, the infrastructure fault is rectified as quickly as possible, a fault processing delay is reduced, and system performance can be improved.

It should be understood that, a receiver of the self-healing policy information may be a VIM.

It should also be understood that, NFV faults may include NFVI faults, VNF faults, network faults, and the like. The NFVI faults may include hardware faults (for example, a hard disk input/output fault, a server power outage, and a port fault) and VM faults. The VNF faults may be VNF software faults. An NFVI fault may be passed to a VNF and cause a VNF fault.

The VIM can perform a health check on an NFVI to detect and determine an NFVI fault in time. The health check may be implemented by means of a heartbeat packet, a watchdog, or the like in the prior art. A manner of determining the NFVI fault by the VIM is not limited in this embodiment of the present invention.

It should be understood that, a form and specific content of the self-healing policy information are not limited in this embodiment of the present invention, provided that the self-healing policy information can indicate whether to perform the self-healing operation on the NFVI fault.

Optionally, in another embodiment, the process of determining self-healing policy information may include:

determining a prestored self-healing policy, where the prestored self-healing policy includes a network functions virtualization VNF self-healing policy and/or a network service NS self-healing policy; and mapping or converting the prestored self-healing policy to determine the self-healing policy information.

The prestored self-healing policy may include the VNF self-healing policy and/or the NS self-healing policy. In other words, the self-healing policy may be statically prestored in a VNFD, or may be described in an NSD. A network operator may also define the self-healing policy in an NFVO. After the self-healing policy is mapped or converted, the self-healing policy information that can be recognized by the VIM is obtained, and then is sent by the NFVO or a VNFM to the corresponding VIM when VNF instantiation is complete. In this way, when the VIM detects the NFVI fault, the VIM can automatically trigger the self-healing operation on the NFVI fault according to the self-healing policy information.

It should be understood that, the VNFM and the NFVO can recognize a VNF and deploy a VM corresponding to the VNF. However, the VIM can only recognize the VM, but cannot determine which VNF specifically corresponds to the VM. Therefore, the VNFM and/or the NFVO need/needs to map or convert the self-healing policy to the self-healing policy information. The self-healing policy information includes self-healing policy information for a VM corresponding to a VNF instance and self-healing policy information for internal VLs between VMs.

Optionally, in another embodiment, the VNF self-healing policy may include a VNF identity and/or a VNF component identity, and fault type information and self-healing action information.

Specifically, the self-healing policy defined in the VNFD may include a VNF self-healing policy, namely, a self-healing policy for a VNF or a type of VNF. Content of the VNF self-healing policy may be shown in Table 1 described above. Details are not described again herein to avoid repetition.

When a VNF includes multiple VNF components (VNFC), the VNF self-healing policy defined in the VNFD may include a self-healing policy for multiple different VNFCs and a self-healing policy for VLs between the VNFCs. When a VNF includes only one VNFC, a self-healing policy for the VNF may include a self-healing policy for the VNFC only.

Specifically, a VNF identity in the VNF self-healing policy defined in the VNFD may be identity information (ID) of a VNF defined by a VNF vendor. A VNF identity defined by the operator may be a unique identity of a VNF in a management domain of the operator, or a type of VNF (for example, an MME) may be specified. The fault type information may include a hardware fault (for example, a hard disk input/output fault), a server power outage, a host operating system fault, a port fault, or the like. The self-healing action information may include starting self-healing information and/or forbidding self-healing information. The starting self-healing information may instruct the VIM to automatically trigger the self-healing operation. The forbidding self-healing information may instruct the VIM to forbid automatically triggering the self-healing operation. It should be understood that, the VNF self-healing policy defined by the operator or the VNF self-healing policy defined in the VNFD may be shown in Table 1 above. Details are not described again herein to avoid repetition.

Optionally, in another embodiment, the NS self-healing policy may include a VNF self-healing policy and a self-healing policy for virtual links between multiple VNFs, where the self-healing policy for the virtual links includes virtual link identities and self-healing action information.

The self-healing policy for the VLs (including internal or external VLs of VNFs) may include virtual link VL identities and self-healing action information, as shown in Table 2 described above. The self-healing action information may include starting self-healing information and/or forbidding self-healing information. For an internal VL of a VNF, a VL identity can identify a VL between two specific VNFCs in a specific VNF. For an external VL between VNFs, a VL identity can identify a VL between two specific VNFs.

The NS self-healing policy defined in the NSD may include an NS identity and self-healing action information, where the self-healing action information may include starting self-healing information and/or forbidding self-healing information, and the NS self-healing policy may be shown in Table 3 described above. Specifically, the NS self-healing policy may be shown in Table 3 described above. Details are not described again herein to avoid repetition.

The self-healing policy defined in the NSD may include an NS self-healing policy, namely, a self-healing policy for an NS or a type of NS. The NS self-healing policy may include a self-healing policy for multiple VNFs that constitute an NS and a self-healing policy for external virtual links between the VNFs. The NS self-healing policy defined in the NSD may include a self-healing policy for VNFs that constitute a network service (NS) and a self-healing policy for VNFFGs or virtual links that constitute the NS.

When the self-healing policy information obtained after the mapping or conversion indicates, to the VIM, that the self-healing operation is to be performed on the NFVI fault, the VIM performs the self-healing operation. It should be understood that, the self-healing operation may be the same as a conventional self-healing process. This embodiment of the present invention does not limit how the VIM performs self-healing on the detected NFVI fault.

Optionally, in another embodiment, the self-healing policy information may include a virtual machine identity and/or a virtual link identity, and fault type information and self-healing action information, where the self-healing action information includes starting self-healing information and/or forbidding self-healing information.

As can be learned from the foregoing description, the self-healing policy information may be obtained by mapping and converting the VNF self-healing policy and/or the NS self-healing policy. The self-healing policy information may include a virtual machine VM identity, or a virtual machine identity and a virtual link identity, and fault type information and self-healing action information, as shown in Table 4 described above. The self-healing action information may include starting self-healing information and/or forbidding self-healing information.

In other words, when the NS includes one VNF, the self-healing policy information mapped or converted from the NS self-healing policy may include a virtual machine identity, fault type information, and self-healing action information; when the NS includes multiple VNFs, the NS self-healing policy includes a self-healing policy for the multiple VNFs and a self-healing policy for external VLs between the VNFs, where the self-healing policy for the external VLs may be mapped or converted to self-healing policy information for VLs between VMs. The self-healing policy information for the VLs may include VL identities and self-healing action information. Therefore, the self-healing policy information mapped or converted from the NS self-healing policy may include a virtual machine identity, a virtual link identity, fault type information, and self-healing action information.

Optionally, in another embodiment, the self-healing policy information mapped or converted from the self-healing policy for the VLs (internal or external VLs of VNFs) may include VL identities and self-healing action information. The self-healing action information may include starting self-healing information and/or forbidding self-healing information. A VL identity can identify a VL between two specific VMs.

Optionally, in another embodiment, after the self-healing operation is performed when the self-healing policy information indicates, to the VIM, that the self-healing operation is to be performed on the NFVI fault, the method may further include:

930. Receive self-healing start information, where the self-healing start information is used to indicate that the self-healing operation on the NFVI fault is started.

940. Forbid, according to the self-healing start information, repeatedly starting the self-healing operation.

In this embodiment of the present invention, the VIM sends, to the NFVO and/or the VNFM, the self-healing start information that can indicate that the VIM has started the self-healing operation on the NFVI fault. In this way, after receiving the self-healing start information, the NFVO and/or the VNFM may not start a VNF/VM self-healing operation. Therefore, a conflict that may be caused by the self-healing operation triggered by the NFVO or the VNFM and the self-healing operation triggered by the VIM is avoided.

Optionally, in another embodiment, after the receiving self-healing start information, the method may further include:

950. Receive self-healing complete information, where the self-healing complete information is used to indicate that the self-healing operation on the NFVI fault is complete.

It should be understood that, if the NFVI fault triggers a VNF/VM fault, the NFVO and/or the VNFM may start the self-healing operation for a virtualized network function VNF after receiving the self-healing complete information. If creation of a VM is complete, after the NFVO and/or the VNFM receive/receives the self-healing complete information, the VNFM and/or an EMS may perform a service-related configuration for the new VM.

Optionally, in another embodiment, the method shown in FIG. 9 may further include:

960. Update a prestored self-healing policy.

Specifically, the NFVO or the VNFM may update the self-healing policy according to a requirement. In other words, an updated self-healing policy may be mapped or converted, and updated self-healing policy information may be obtained.

Figure 10:
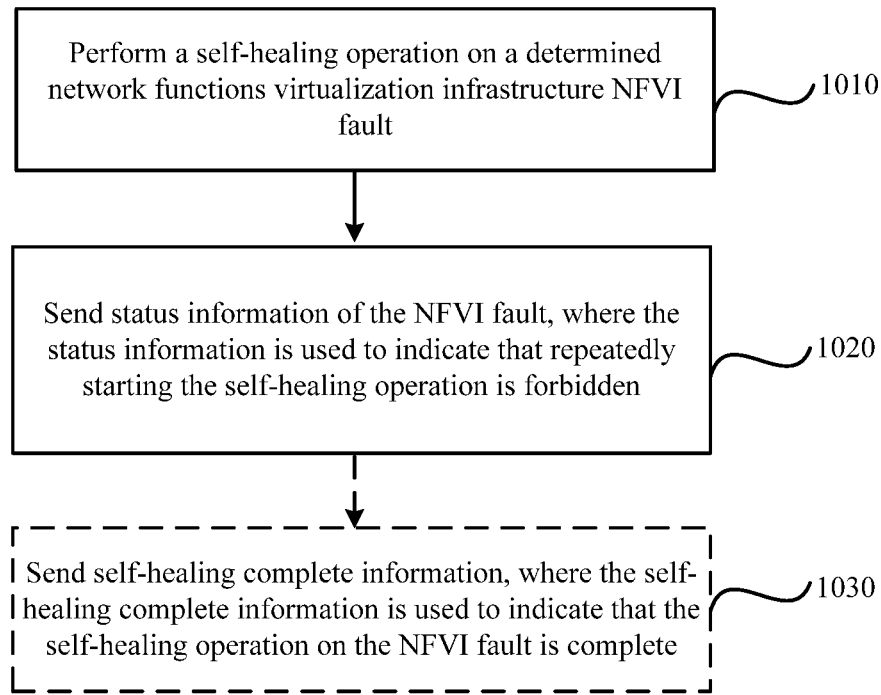
FIG. 10 is a schematic flowchart of a network functions virtualization based fault processing method according to another embodiment of the present invention.

FIG. 10 is a schematic flowchart of a network functions virtualization based fault processing method according to another embodiment of the present invention. The method shown in FIG. 10 may be performed by a VIM. The method may include the following steps.

1010. Perform a self-healing operation on a determined network functions virtualization infrastructure NFVI fault.

1020. Send status information of the NFVI fault, where the status information is used to indicate that repeatedly starting the self-healing operation is forbidden.

In this embodiment of the present invention, status information is sent to an NFVO and/or a VNFM, where the status information is used to indicate that the self-healing operation for a virtualized network function VNF is forbidden. In this way, after receiving the status information, a receiver does not repeatedly start the self-healing operation, and therefore, a conflict that may be caused by repeatedly started self-healing operations is avoided.

It should be understood that, the receiver of the status information of the NFVI fault may be the VNFM and/or the NFVO.

It should also be understood that, the status information may be used to indicate a status of the NFVI fault, that is, the status information may indicate a processing phase of the NFVI fault, for example, whether the self-healing operation on the NFVI fault is started.

Optionally, in another embodiment, the status information may include self-healing start information, and the self-healing start information is used to indicate that the self-healing operation on the NFVI fault is started, so that the NFVO and/or the VNFM forbid/forbids, according to the self-healing start information, repeatedly starting the self-healing operation.

It should be understood that, the self-healing start information is used as indication information to notify the NFVO and/or the VNFM that a VIM is performing the self-healing operation on the NFVI fault and that a self-healing operation on a VNF fault caused by the NVFI fault is forbidden.

That is, if the NFVI fault is processed, the self-healing operation does not need to be performed again on the VNF fault triggered by the NFVI fault.

When sending the self-healing start information to the NFVO and/or the VNFM, the VIM may further send fault information of the NFVI fault to the NFVO and/or the VNFM.

Specifically, after the self-healing operation is complete, the VIM may send self-healing complete information to the NFVO and/or the VNFM. In this way, after receiving the self-healing complete information, the NFVO and/or the VNFM may trigger a reconfiguration of a recovered VM or VNF.

It should be understood that, the self-healing start information may be used as indication information to notify the NFVO and/or the VNFM that the VIM is performing the self-healing operation on the NFVI fault and that the self-healing operation on the VNF fault caused by the NVFI fault is forbidden.

Optionally, in another embodiment, after the sending status information, the method shown in FIG. 10 may further include:

1030. Send self-healing complete information, where the self-healing complete information is used to indicate that the self-healing operation on the NFVI fault is complete.

Optionally, in another embodiment, the self-healing start information in this embodiment of the present invention may not be sent, and only the self-healing complete information is sent; or the self-healing complete information may be sent after the self-healing start information is sent. In this way, after the NFVO and/or the VNFM receive/receives the self-healing complete information, the reconfiguration of the recovered VM or VNF may be triggered.

Optionally, in another embodiment, when self-healing policy information indicates that the self-healing operation on the NFVI fault is forbidden, the VIM may send the fault information of the NFVI fault to the NFVO and/or the VNFM. In this case, a subsequent operation may be the same as an operation performed after the VIM reports the fault information in the prior art. A process performed after the VIM reports the fault information is not limited in this embodiment of the present invention.

Optionally, in another embodiment, before the VIM determines, according to self-healing policy information, whether to perform the self-healing operation on the NFVI fault, the VIM may further perform a health check on an NFVI to detect the NFVI fault and determine a virtual machine affected by the NFVI fault. In addition, the VIM may further view the self-healing policy information.

Optionally, in another embodiment, the performing a self-healing operation on a determined network functions virtualization infrastructure NFVI fault may include:

selecting a new server for deploying a virtual machine that is affected by the NFVI fault; and creating a virtual machine.

It should be understood that, when the VIM creates the virtual machine, if the fault is not a storage resource fault or a network fault, the created virtual machine may continue to use previous storage resources and network resources. It should also be understood that, when the VIM completes creation of the virtual machine, the VIM completes the self-healing operation. The VIM may send the self-healing complete information to the NFVO and/or the VNFM. The VNFM and/or an EMS may perform a service-related configuration for the new VM.

Figure 11:
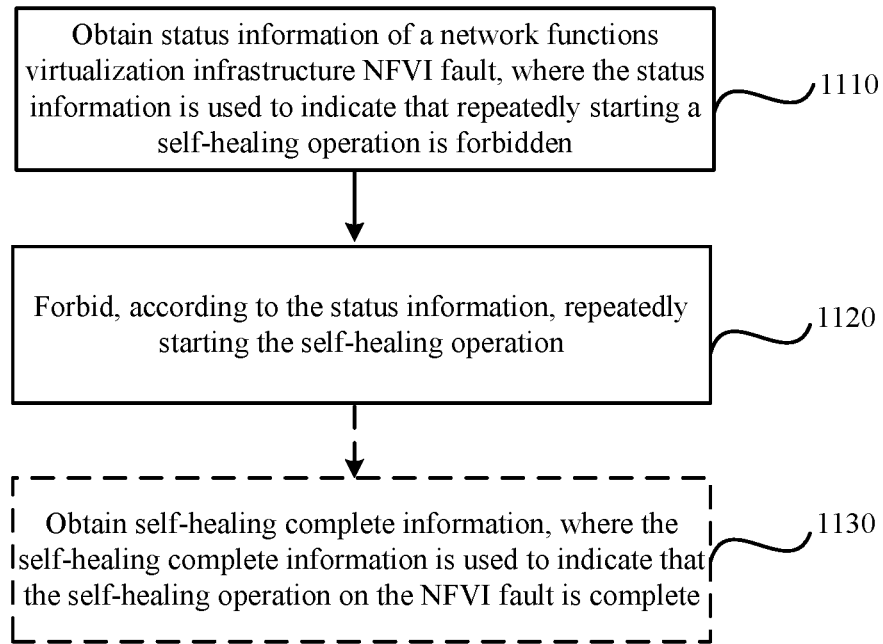
FIG. 11 is a flowchart of a network functions virtualization based fault processing method according to another embodiment of the present invention.

FIG. 11 is a flowchart of a network functions virtualization based fault processing method according to another embodiment of the present invention. The method shown in FIG. 11 may be performed by an NFVO and/or a VNFM. The method may include the following steps.

1110. Obtain status information of a network functions virtualization infrastructure NFVI fault, where the status information is used to indicate that repeatedly starting a self-healing operation is forbidden.

1120. Forbid, according to the status information, repeatedly starting the self-healing operation.

In this embodiment of the present invention, status information is sent, and the status information is used to indicate that repeatedly starting a self-healing operation for a virtualized network function VNF is forbidden. In this way, after receiving self-healing start information, a receiver does not repeatedly start the self-healing operation, and therefore, a conflict that may be caused by repeatedly started self-healing operations is avoided.

It should be understood that, an NFVO and/or a VNFM may obtain the status information of the NFVI fault from a VIM.

It should also be understood that, the status information may be used to indicate a status of the NFVI fault, that is, the status information may indicate a processing phase of the NFVI fault, for example, whether the self-healing operation on the NFVI fault is started.

Optionally, in another embodiment, the status information may include self-healing start information, and the self-healing start information is used to indicate that the VIM has started the self-healing operation on the NFVI fault.

That is, if the NFVI fault is processed, the self-healing operation does not need to be performed again on a VNF fault triggered by the NFVI fault.

When sending the self-healing start information to the NFVO and/or the VNFM, the VIM may further send fault information of the NFVI fault to the NFVO and/or the VNFM.

Specifically, after the self-healing operation is complete, the VIM may send self-healing complete information to the NFVO and/or the VNFM. In this way, after receiving the self-healing complete information, the NFVO and/or the VNFM may trigger a reconfiguration of a recovered VM or VNF.

It should be understood that, the self-healing start information may be used as indication information to notify the NFVO and/or the VNFM that the VIM is performing the self-healing operation on the NFVI fault and that the self-healing operation on the VNF fault caused by the NVFI fault is forbidden.

Optionally, in another embodiment, after the obtaining status information, the method shown in FIG. 11 may further include:

1130. Obtain self-healing complete information, where the self-healing complete information is used to indicate that the self-healing operation on the NFVI fault is complete.

Optionally, in another embodiment, the self-healing start information in this embodiment of the present invention may not be obtained, and only the self-healing complete information is obtained; or the self-healing complete information may be obtained after the self-healing start information is obtained. In this way, after the NFVO and/or the VNFM obtain/obtains the self-healing complete information, the reconfiguration of the recovered VM or VNF may be triggered.

Figure 12:
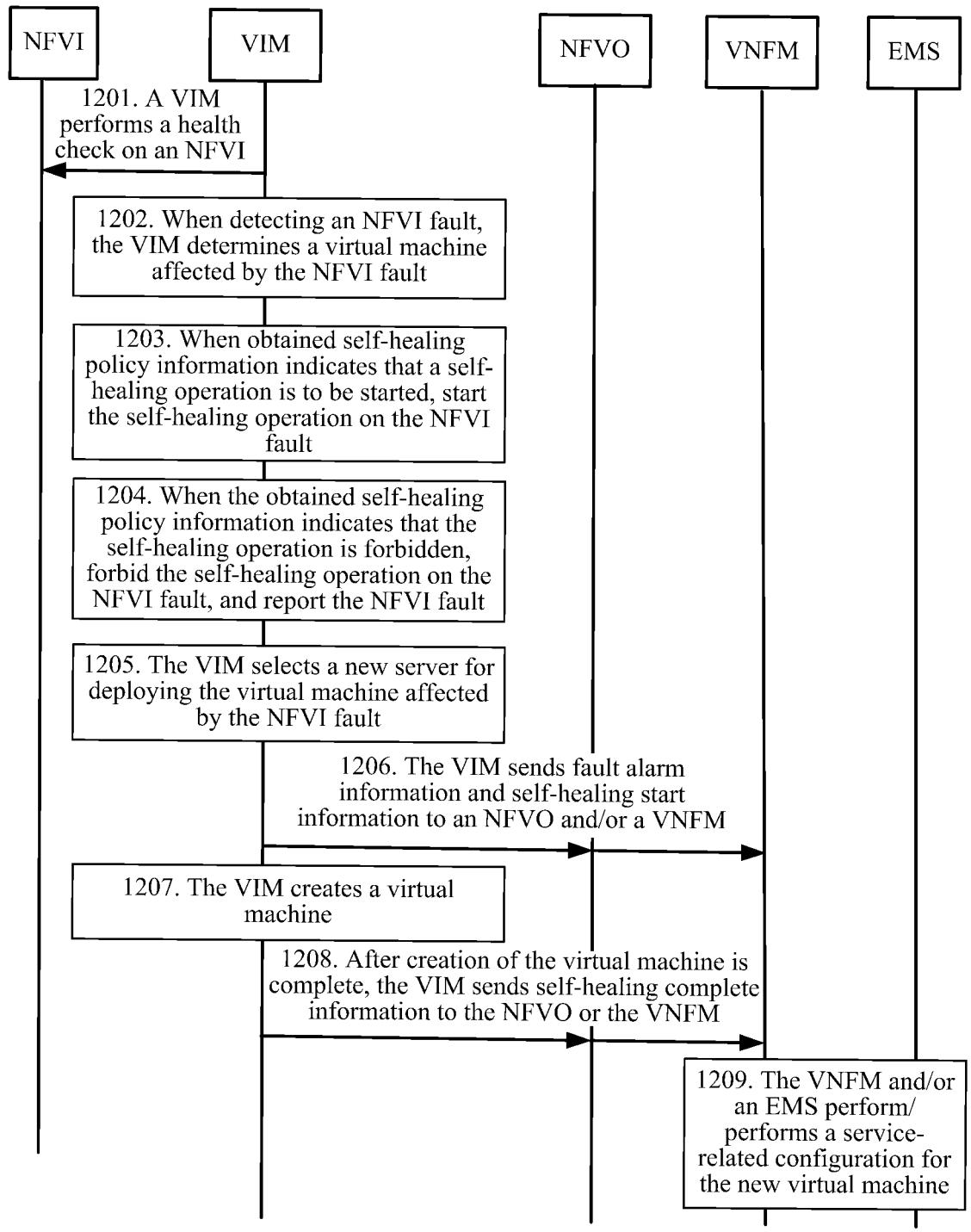
FIG. 12 is a schematic flowchart of a network functions virtualization based fault processing process according to an embodiment of the present invention.

FIG. 12 is a schematic flowchart of a network functions virtualization based fault processing process according to an embodiment of the present invention. The process may include the following steps.

1201. A VIM performs a health check on an NFVI.

The VIM performs the health check on the NFVI to detect an NFVI fault in time.

Specifically, in this embodiment of the present invention, the health check may be implemented by using a technique such as a heartbeat packet or a watchdog. It should be understood that, a manner of the health check is not limited in this embodiment of the present invention.

1202. When detecting an NFVI fault, the VIM determines a virtual machine affected by the NFVI fault.

1203. When obtained self-healing policy information indicates that a self-healing operation is to be started, the self-healing operation on the NFVI fault is started.

1204. When the obtained self-healing policy information indicates that the self-healing operation is forbidden, forbid the self-healing operation on the NFVI fault, and report the NFVI fault.

It should be understood that, steps 1203 and 1204 may be parallel steps. Specifically, if the self-healing policy information indicates that the self-healing operation is to be started, the VIM starts the self-healing operation for the NFVI, and reports the NFVI fault to an NFVO or a VNFM. If the self-healing policy information indicates that the self-healing operation is forbidden, the VIM reports the self-healing operation to the NFVO or the VNFM, and waits for a fault processing request or instruction.

In this case, a subsequent operation may be the same as an operation performed after the VIM reports the fault information in the prior art. A process performed after the VIM reports the fault information of the NFVI fault is not limited in this embodiment of the present invention.

If the self-healing operation on the NFVI fault is started in step 1203, steps 1205 and 1206 may be performed. If the self-healing operation is forbidden in step 1204, step 1205 and subsequent operations are not performed; instead, the fault information is reported directly, and the instruction is waited for.

1205. The VIM selects a new server for deploying the virtual machine affected by the NFVI fault.

1206. The VIM sends fault alarm information and self-healing start information to an NFVO and/or a VNFM.

Specifically, the self-healing start information is used to indicate that the VIM has started the self-healing operation on the NFVI fault. The self-healing start information is used as indication information to notify the NFVO and/or the VNFM that the VIM is performing the self-healing operation on the NFVI fault and that a self-healing operation on a VNF fault caused by the NVFI fault is forbidden.

Optionally, in another embodiment, the VNFM may further send the fault alarm information and the self-healing start information to an EMS.

1207. The VIM creates a virtual machine.

It should be understood that, when the VIM creates the virtual machine, if the fault is not a storage resource fault or a network fault, the created virtual machine may continue to use previous storage resources and network resources.

1208. After creation of the virtual machine is complete, the VIM sends self-healing complete information to the NFVO or the VNFM.

Specifically, the self-healing complete information is used to indicate that the VIM has completed the self-healing operation on the NFVI fault.

Optionally, in another embodiment, the VNFM may further send the self-healing complete information to the EMS.

1209. The VNFM and/or an EMS perform/performs a service-related configuration for the new virtual machine.

It should also be understood that, when the VIM completes creation of the virtual machine, the VIM completes the self-healing operation. The VIM may send the self-healing complete information to the NFVO and/or the VNFM. The VNFM and/or the EMS may perform the service-related configuration for the new VM.

In this embodiment of the present invention, because an infrastructure fault itself is a root-cause fault, no fault analysis is required. Therefore, after a network functions virtualization infrastructure fault is determined, a virtualized infrastructure manager VIM can perform determining according predefined self-healing policy information that indicates, to the virtualized infrastructure manager, whether to perform a self-healing operation. When the self-healing policy information indicates that the self-healing operation is to be performed, the VIM can perform self-healing on the determined fault in time. Therefore, in this embodiment of the present invention, time for reporting and making a fault analysis for the infrastructure fault can be saved, the infrastructure fault is rectified as quickly as possible, a fault processing delay is reduced, and system performance can be improved.

Figure 13:
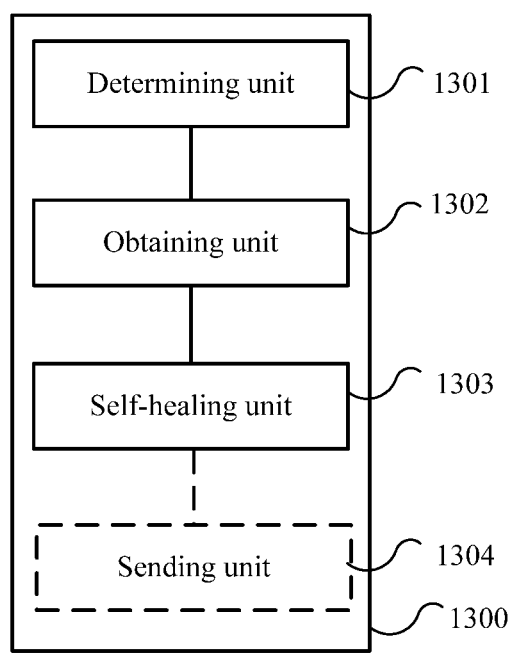
FIG. 13 is a schematic block diagram of an apparatus according to an embodiment of the present invention.

FIG. 13 is a schematic block diagram of an apparatus according to an embodiment of the present invention. The apparatus 1300 shown in FIG. 13 may include:

a determining unit 1301 configured for determining a network functions virtualization infrastructure NFVI fault;

an obtaining unit 1302 configured for obtaining self-healing policy information, where the self-healing policy information is used to indicate whether to perform a self-healing operation on the NFVI fault; and a self-healing unit 1303 configured for performing the self-healing operation on the NFVI fault when the self-healing policy information indicates that the self-healing operation is to be performed on the NFVI fault.

In this embodiment of the present invention, because an infrastructure fault itself is a root-cause fault, no fault analysis is required. Therefore, after a network functions virtualization infrastructure fault is determined, determining can be performed according to obtained self-healing policy information that indicates whether to perform a self-healing operation on the network functions virtualization infrastructure fault. When the self-healing policy information indicates that the self-healing operation is to be performed, the determined fault can be self-healed in time. Therefore, in this embodiment of the present invention, time for reporting and making a fault analysis for the infrastructure fault can be saved, the infrastructure fault is rectified as quickly as possible, a fault processing delay is reduced, and system performance can be improved.

It should be understood that, the apparatus shown in FIG. 13 may implement the method shown in FIG. 1 or the process shown in FIG. 12. Details are not described again herein to avoid repetition.

Optionally, in another embodiment, the self-healing policy information may include updated self-healing policy information.

Optionally, in another embodiment, the apparatus 1300 may further include:

a sending unit 1304 for sending self-healing start information, where the self-healing start information is used to indicate that the self-healing operation on the NFVI fault is started.

Optionally, in another embodiment, the sending unit 1304 may further send self-healing complete information, where the self-healing complete information is used to indicate that the self-healing operation on the NFVI fault is complete.

Optionally, in another embodiment, the sending unit 1304 may further send fault information of the NFVI fault when the self-healing policy information indicates that the self-healing operation on the NFVI fault is forbidden.

Optionally, in another embodiment, the self-healing unit 1303 may select a new server for deploying a virtual machine that is affected by the NFVI fault; and create a virtual machine.

Optionally, in another embodiment, the self-healing policy information includes a virtual machine identity, fault type information, and self-healing action information, or the self-healing policy information includes a virtual machine identity, a virtual link identity, fault type information, and self-healing action information, where the self-healing action information includes starting self-healing information and/or forbidding self-healing information.

Figure 14:
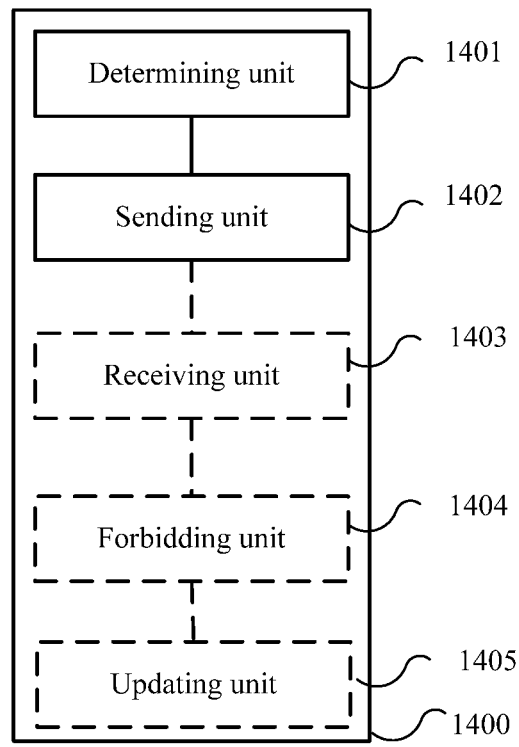
FIG. 14 is a schematic block diagram of another apparatus according to an embodiment of the present invention.

FIG. 14 is a schematic block diagram of another apparatus according to an embodiment of the present invention. The apparatus 1400 shown in FIG. 14 may include:

a determining unit 1401 for determining self-healing policy information, where the self-healing policy information is used to indicate whether to perform a self-healing operation on an NFVI fault; and a sending unit 1402 for sending the self-healing policy information, so that the self-healing operation is performed on the NFVI fault when the self-healing policy information indicates that the self-healing operation is to be performed on the determined network functions virtualization infrastructure NFVI fault.

In this embodiment of the present invention, because an infrastructure fault itself is a root-cause fault, no fault analysis is required. Therefore, after a network functions virtualization infrastructure fault is determined, determining can be performed according to obtained self-healing policy information that indicates whether to perform a self-healing operation on the network functions virtualization infrastructure fault. When the self-healing policy information indicates that the self-healing operation is to be performed, the determined fault can be self-healed in time. Therefore, in this embodiment of the present invention, time for reporting and making a fault analysis for the infrastructure fault can be saved, the infrastructure fault is rectified as quickly as possible, a fault processing delay is reduced, and system performance can be improved.

It should be understood that, the apparatus shown in FIG. 14 may implement the method shown in FIG. 9 or the process shown in FIG. 12. Details are not described again herein to avoid repetition.

Optionally, in another embodiment, the determining unit 1401 may determine a prestored self-healing policy, where the prestored self-healing policy includes a network functions virtualization VNF self-healing policy and/or a network service NS self-healing policy; and map or convert the prestored self-healing policy to determine the self-healing policy information.

Optionally, in another embodiment, the apparatus 1400 may further include:

a receiving unit 1403 for receiving self-healing start information, where the self-healing start information is used to indicate that the self-healing operation on the NFVI fault is started; and a forbidding unit 1404 for forbidding, according to the self-healing start information, repeatedly starting the self-healing operation.

Optionally, in another embodiment, the receiving unit 1403 may further receive self-healing complete information, where the self-healing complete information is used to indicate that the self-healing operation on the NFVI fault is complete.

Optionally, in another embodiment, the apparatus 1400 may further include:

an updating unit 1405 for updating the prestored self-healing policy.

Optionally, in another embodiment, the VNF self-healing policy may include a VNF identity and/or a VNF component identity, and fault type information and self-healing action information.

Optionally, in another embodiment, the NS self-healing policy may include the VNF self-healing policy and a self-healing policy for virtual links between multiple VNFs, where the self-healing policy for the virtual links includes virtual link identities and self-healing action information.

Optionally, in another embodiment, the self-healing policy information may include a virtual machine identity, fault type information, and self-healing action information, or self-healing policy information includes a virtual machine identity, a virtual link identity, fault type information, and self-healing action information, where the self-healing action information includes starting self-healing information and/or forbidding self-healing information.

Figure 15:
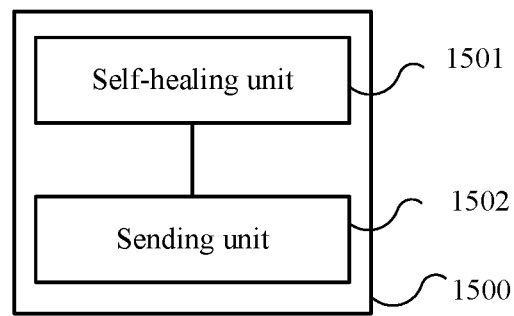
FIG. 15 is a schematic block diagram of another apparatus according to an embodiment of the present invention.

FIG. 15 is a schematic block diagram of another apparatus according to an embodiment of the present invention. The apparatus 1500 shown in FIG. 15 may include:

a self-healing unit 1501 for performing a self-healing operation on a determined network functions virtualization infrastructure NFVI fault; and a sending unit 1502 for sending status information of the NFVI fault, where the status information is used to indicate that repeatedly starting the self-healing operation is forbidden.

In this embodiment of the present invention, status information is sent, and the status information is used to indicate that repeatedly starting a self-healing operation for a virtualized network function VNF is forbidden. In this way, after receiving self-healing start information, a receiver does not repeatedly start the self-healing operation, and therefore, a conflict that may be caused by repeatedly started self-healing operations is avoided.

It should be understood that, the apparatus 1500 may implement the method in FIG. 10 or the process in FIG. 12. Details are not described again herein to avoid repetition.

Optionally, in another embodiment, the status information includes self-healing start information, and the self-healing start information is used to indicate that the self-healing operation on the NFVI fault is started.

Optionally, in another embodiment, the sending unit 1502 may further send self-healing complete information, where the self-healing complete information is used to indicate that the self-healing operation on the NFVI fault is complete.

Optionally, in another embodiment, the self-healing unit 1501 may select a new server for deploying a virtual machine that is affected by the NFVI fault; and create a virtual machine.

Figure 16:
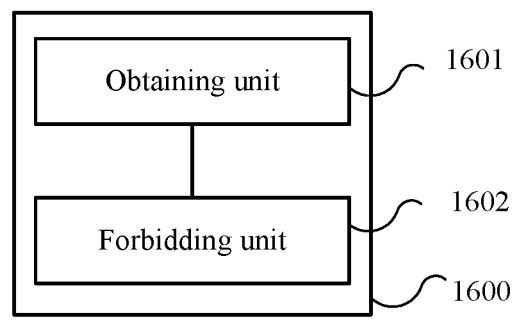
FIG. 16 is a schematic block diagram of another apparatus according to an embodiment of the present invention.

FIG. 16 is a schematic block diagram of another apparatus according to an embodiment of the present invention. The apparatus 1600 shown in FIG. 16 may include:

an obtaining unit 1601 for obtaining status information of a network functions virtualization infrastructure NFVI fault, where the status information is used to indicate that repeatedly starting a self-healing operation is forbidden; and a forbidding unit 1602 for forbidding, according to the status information, repeatedly starting the self-healing operation.

In this embodiment of the present invention, status information may be sent, and the status information is used to indicate that repeatedly starting a self-healing operation for a virtualized network function VNF is forbidden. In this way, after receiving self-healing start information, a receiver does not repeatedly start the self-healing operation, and therefore, a conflict that may be caused by repeatedly started self-healing operations is avoided.

It should be understood that, the apparatus 1600 may implement the method in FIG. 11 or the process in FIG. 12. Details are not described again herein to avoid repetition.

Optionally, in another embodiment, the status information includes self-healing start information, and the self-healing start information is used to indicate that the self-healing operation on the NFVI fault is started.

Optionally, in another embodiment, the obtaining unit 1601 may further obtain self-healing complete information, where the self-healing complete information is used to indicate that the self-healing operation on the NFVI fault is complete.

Figure 17:
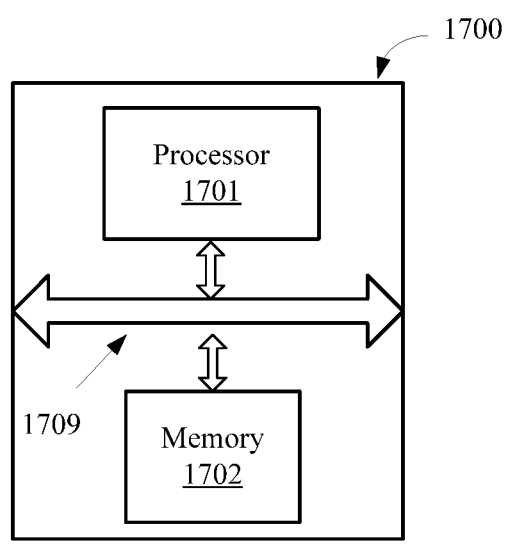
FIG. 17 is a schematic block diagram of another apparatus according to an embodiment of the present invention.

FIG. 17 is a schematic block diagram of another apparatus according to an embodiment of the present invention. The apparatus 1700 in FIG. 17 may be configured to implement the steps and methods in the foregoing method embodiments. The apparatus in FIG. 17 includes a processor 1701 and a memory 1702. The processor 1701 and the memory 1702 are connected by a bus system 1709.

The processor 1701 controls operations of the apparatus 1700. The memory 1702 may include a read-only memory and a random access memory, and provide an instruction and data to the processor 1701. A part of the memory 1702 may further include a non-volatile random access memory (NVRAM). Components of the apparatus 1700 are coupled together by the bus system 1709. The bus system 1709 further includes a power bus, a control bus, and a status signal bus, in addition to a data bus. However, for clear description, various buses in the figure are marked as the bus system 1709.

The processor 1701 may be an integrated circuit chip, and has a signal processing capability. The processor 1701 may be a general purpose processor, a digital signal processor (DSP), an application-specific integrated circuit (ASIC), a field programmable gate array (FPGA), or another programmable logic device, discrete gate or transistor logic device, or discrete hardware component. The processor may implement or execute the methods, steps, and logic block diagrams disclosed in the embodiments of the present invention. The general purpose processor may be a microprocessor, or the processor may be any conventional processor or the like. The processor 1701 reads information in the memory 1702, and based on hardware of the processor 1701, controls each part of the apparatus 1700.

The method in FIG. 1 may be implemented in the apparatus 1700 in FIG. 17. Details are not described again to avoid repetition.

Specifically, under control of the processor 1701, the apparatus 1700 implements the following operations:

determining a network functions virtualization infrastructure NFVI fault;

obtaining self-healing policy information, where the self-healing policy information is used to indicate whether to perform a self-healing operation on the NFVI fault; and performing the self-healing operation on the NFVI fault when the self-healing policy information indicates that the self-healing operation is to be performed on the NFVI fault.

In this embodiment of the present invention, because an infrastructure fault itself is a root-cause fault, no fault analysis is required. Therefore, after a network functions virtualization infrastructure fault is determined, a virtualized infrastructure manager VIM can perform determining according predefined self-healing policy information that indicates, to the virtualized infrastructure manager, whether to perform a self-healing operation. When the self-healing policy information indicates that the self-healing operation is to be performed, the VIM can perform self-healing on the determined fault in time. Therefore, in this embodiment of the present invention, time for reporting and making a fault analysis for the infrastructure fault can be saved, the infrastructure fault is rectified as quickly as possible, a fault processing delay is reduced, and system performance can be improved.

Optionally, in another embodiment, the self-healing policy information may include updated self-healing policy information.

Optionally, in another embodiment, the processor 1701 may further send self-healing start information, where the self-healing start information is used to indicate that the self-healing operation on the NFVI fault is started.

Optionally, in another embodiment, the processor 1701 may further send self-healing complete information, where the self-healing complete information is used to indicate that the self-healing operation on the NFVI fault is complete.

Optionally, in another embodiment, when the self-healing policy information indicates that the self-healing operation on the NFVI fault is forbidden, the processor 1701 may send fault information of the NFVI fault.

Optionally, in another embodiment, when the self-healing policy information indicates that the self-healing operation is to be performed on the NFVI fault, the self-healing operation is performed. The processor 1701 may select a new server for deploying a virtual machine that is affected by the NFVI fault; and create a virtual machine.

Optionally, in another embodiment, the self-healing policy information includes a virtual machine identity, fault type information, and self-healing action information, or the self-healing policy information includes a virtual machine identity, a virtual link identity, fault type information, and self-healing action information, where the self-healing action information includes starting self-healing information and/or forbidding self-healing information.

Figure 18:
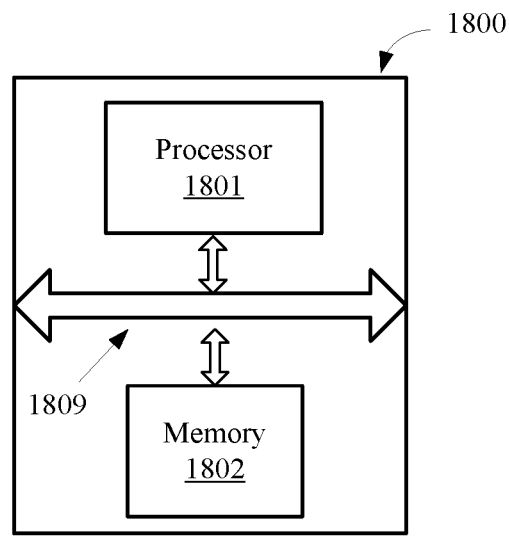
FIG. 18 is a schematic block diagram of another apparatus according to an embodiment of the present invention.

FIG. 18 is a schematic block diagram of another apparatus according to an embodiment of the present invention. The apparatus 1800 in FIG. 18 may be configured to implement the steps and methods in the foregoing method embodiments. The apparatus in FIG. 18 includes a processor 1801 and a memory 1802. The processor 1801 and the memory 1802 are connected by a bus system 1809.

The processor 1801 controls operations of the apparatus 1800. The memory 1802 may include a read-only memory and a random access memory, and provide an instruction and data to the processor 1801. A part of the memory 1802 may further include a non-volatile random access memory (NVRAM). Components of the apparatus 1800 are coupled together by the bus system 1809. The bus system 1809 further includes a power bus, a control bus, and a status signal bus, in addition to a data bus. However, for clear description, various buses in the figure are marked as the bus system 1809.

The processor 1801 may be an integrated circuit chip, and has a signal processing capability. The processor 1801 may be a general purpose processor, a DSP, an ASIC, a FPGA, or another programmable logic device, discrete gate or transistor logic device, or discrete hardware component. The processor may implement or execute the methods, steps, and logic block diagrams disclosed in the embodiments of the present invention. The general purpose processor may be a microprocessor, or the processor may be any conventional processor or the like. The processor 1801 reads information in the memory 1802, and based on hardware of the processor 1801, controls each part of the apparatus 1800.

The method in FIG. 9 may be implemented in the apparatus 1800 in FIG. 18. Details are not described again to avoid repetition.

Specifically, under control of the processor 1801, the apparatus 1800 implements the following operations:

determining self-healing policy information, where the self-healing policy information is used to indicate whether to perform a self-healing operation on an NFVI fault; and sending the self-healing policy information, so that the self-healing operation is performed on the NFVI fault when the self-healing policy information indicates that the self-healing operation is to be performed on the determined network functions virtualization infrastructure NFVI fault.

In this embodiment of the present invention, because an infrastructure fault itself is a root-cause fault, no fault analysis is required. Therefore, after a network functions virtualization infrastructure fault is determined, a virtualized infrastructure manager VIM can perform determining according predefined self-healing policy information that indicates, to the virtualized infrastructure manager, whether to perform a self-healing operation. When the self-healing policy information indicates that the self-healing operation is to be performed, the VIM can perform self-healing on the determined fault in time. Therefore, in this embodiment of the present invention, time for reporting and making a fault analysis for the infrastructure fault can be saved, the infrastructure fault is rectified as quickly as possible, a fault processing delay is reduced, and system performance can be improved.

Optionally, in another embodiment, after the self-healing operation is performed when the self-healing policy information indicates, to the VIM, that the self-healing operation is to be performed on the NFVI fault, the processor 1801 may receive self-healing start information sent by the VIM, where the self-healing start information is used to indicate that the VIM has started the self-healing operation on the NFVI fault; and forbid, according to the self-healing start information, repeatedly starting the self-healing operation for a virtualized network function VNF.

Optionally, in another embodiment, the processor 1801 may determine a prestored self-healing policy, where the prestored self-healing policy includes a network functions virtualization VNF self-healing policy and/or a network service NS self-healing policy; and map or convert the prestored self-healing policy to determine the self-healing policy information.

Optionally, in another embodiment, the processor 1801 may receive self-healing start information, where the self-healing start information is used to indicate that the self-healing operation on the NFVI fault is started; and forbid, according to the self-healing start information, repeatedly starting the self-healing operation.

Optionally, in another embodiment, the processor 1801 may receive self-healing complete information, where the self-healing complete information is used to indicate that the self-healing operation on the NFVI fault is complete.

Optionally, in another embodiment, the processor 1801 may further update the prestored self-healing policy.

Optionally, in another embodiment, the VNF self-healing policy includes a VNF identity and/or a VNF component identity, and fault type information and self-healing action information.

Optionally, in another embodiment, the NS self-healing policy includes the VNF self-healing policy and a self-healing policy for virtual links between multiple VNFs, where the self-healing policy for the virtual links includes virtual link identities and self-healing action information.

Optionally, in another embodiment, the self-healing policy information includes a virtual machine identity, fault type information, and self-healing action information, or the self-healing policy information includes a virtual machine identity, a virtual link identity, fault type information, and self-healing action information, where the self-healing action information includes starting self-healing information and/or forbidding self-healing information.

Figure 19:
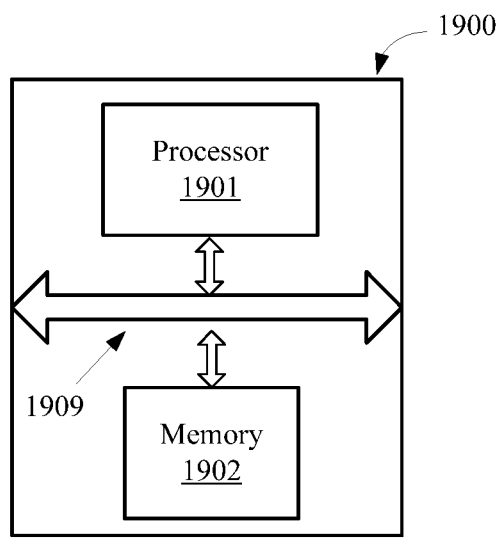
FIG. 19 is a schematic block diagram of another apparatus according to an embodiment of the present invention.

FIG. 19 is a schematic block diagram of another apparatus according to an embodiment of the present invention. The apparatus 1900 in FIG. 19 may be configured to implement the steps and methods in the foregoing method embodiments. The apparatus in FIG. 19 includes a processor 1901 and a memory 1902. The processor 1901 and the memory 1902 are connected by a bus system 1909.

The processor 1901 controls operations of the apparatus 1900. The memory 1902 may include a read-only memory and a random access memory, and provide an instruction and data to the processor 1901. A part of the memory 1902 may further include a NVRAM. Components of the apparatus 1900 are coupled together by the bus system 1909. The bus system 1909 further includes a power bus, a control bus, and a status signal bus, in addition to a data bus. However, for clear description, various buses in the figure are marked as the bus system 1909.

The processor 1901 may be an integrated circuit chip, and has a signal processing capability. The processor 1901 may be a general purpose processor, a DSP, an ASIC, a FPGA, or another programmable logic device, discrete gate or transistor logic device, or discrete hardware component. The processor may implement or execute the methods, steps, and logic block diagrams disclosed in the embodiments of the present invention. The general purpose processor may be a microprocessor, or the processor may be any conventional processor or the like. The processor 1901 reads information in the memory 1902, and based on hardware of the processor 1901, controls each part of the apparatus 1900.

The method in FIG. 10 may be implemented in the apparatus 1900 in FIG. 19. Details are not described again to avoid repetition.

Specifically, under control of the processor 1901, the apparatus 1900 implements the following operations:

performing a self-healing operation on a determined network functions virtualization infrastructure NFVI fault; and sending status information of the NFVI fault, where the status information is used to indicate that repeatedly starting the self-healing operation is forbidden.

In this embodiment of the present invention, a VIM sends status information to an NFVO and/or a VNFM, where the status information is used to indicate, to the NFVO and/or the VNFM, that repeatedly starting a self-healing operation for a virtualized network function VNF is forbidden. In this way, after receiving self-healing start information, the NFVO and/or the VNFM may not start a VNF/VM self-healing operation. Therefore, a conflict that may be caused by the self-healing operation triggered by the NFVO or the VNFM and the self-healing operation triggered by the VIM is avoided.

Optionally, in another embodiment, the status information may include self-healing start information, and the self-healing start information is used to indicate that the self-healing operation on the NFVI fault is started.

Optionally, in another embodiment, the processor 1901 may send self-healing complete information, where the self-healing complete information is used to indicate that the self-healing operation on the NFVI fault is complete.

Optionally, in another embodiment, the processor 1901 may select a new server for deploying a virtual machine that is affected by the NFVI fault; and create a virtual machine.

Figure 20:
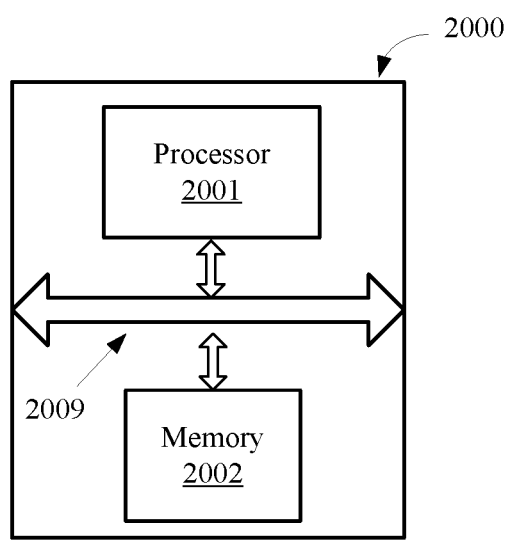
FIG. 20 is a schematic block diagram of another apparatus according to an embodiment of the present invention.

FIG. 20 is a schematic block diagram of another apparatus according to an embodiment of the present invention. The apparatus 2000 in FIG. 20 may be configured to implement the steps and methods in the foregoing method embodiments. The apparatus in FIG. 20 includes a processor 2001 and a memory 2002. The processor 2001 and the memory 2002 are connected by a bus system 2009.

The processor 2001 controls operations of the apparatus 2000. The memory 2002 may include a read-only memory and a random access memory, and provide an instruction and data to the processor 2001. A part of the memory 2002 may further include a NVRAM. Components of the apparatus 2000 are coupled together by the bus system 2009. The bus system 2009 further includes a power bus, a control bus, and a status signal bus, in addition to a data bus. However, for clear description, various buses in the figure are marked as the bus system 2009.

The processor 2001 may be an integrated circuit chip, and has a signal processing capability. The processor 2001 may be a general purpose processor, a DSP, an ASIC, a FPGA, or another programmable logic device, discrete gate or transistor logic device, or discrete hardware component. The processor may implement or execute the methods, steps, and logic block diagrams disclosed in the embodiments of the present invention. The general purpose processor may be a microprocessor, or the processor may be any conventional processor or the like. The processor 2001 reads information in the memory 2002, and based on hardware of the processor 2001, controls each part of the apparatus 2000.

The method in FIG. 11 may be implemented in the apparatus 2000 in FIG. 20. Details are not described again to avoid repetition.

Specifically, under control of the processor 2001, the apparatus 2000 implements the following operations:

obtaining status information of a network functions virtualization infrastructure NFVI fault, where the status information is used to indicate that repeatedly starting a self-healing operation is forbidden; and forbidding, according to the status information, repeatedly starting the self-healing operation.

In this embodiment of the present invention, a VIM sends status information to an NFVO and/or a VNFM, where the status information is used to indicate, to the NFVO and/or the VNFM, that repeatedly starting a self-healing operation for a virtualized network function VNF is forbidden. In this way, after receiving self-healing start information, the NFVO and/or the VNFM may not start a VNF/VM self-healing operation. Therefore, a conflict that may be caused by the self-healing operation triggered by the NFVO or the VNFM and the self-healing operation triggered by the VIM is avoided.

Optionally, in another embodiment, the status information may include self-healing start information, and the self-healing start information is used to indicate that the VIM has started the self-healing operation on the NFVI fault.

Optionally, in another embodiment, after obtaining, from the virtualized infrastructure manager VIM, the status information of the network functions virtualization infrastructure NFVI fault determined by the VIM, the processor 2001 may obtain self-healing complete information, where the self-healing complete information is used to indicate that the self-healing operation on the NFVI fault is complete.

It should be understood that "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. An apparatus, comprising:
a memory; and
a processor coupled to the memory and configured to:
receive a first fault associated with a Network Functions Virtualization (NFV) system, the NFV system comprising a plurality of layers;
determine that the first fault initiated at a first layer of the NFV system, wherein the first layer of the NFV system is a NFV infrastructure (NFVI) layer;
in response to the determination that the first fault initiated at the first layer of the NFV system, a root-cause analysis not being performed on the first fault;
determine, based at least in a part on a self-healing policy information, whether to perform a self-healing operation on the first fault; and
perform the self-healing operation on the first fault when the self-healing policy information indicates that the self-healing operation is to be performed on the first fault.

2. The apparatus according to claim 1, wherein the self-healing policy information includes updated self-healing policy information.

3. The apparatus according to claim 1, wherein the processor is further configured to send self-healing start information, wherein the self-healing start information indicates a start of the self-healing operation on the first fault.

4. The apparatus according to claim 3, wherein the processor is further configured to send self-healing complete information, wherein the self-healing complete information indicates completion of the self-healing operation on the first fault.

5. The apparatus according to claim 3, wherein the processor is further configured to send fault information of the first fault when the self-healing policy information indicates that the self-healing operation on the first fault is forbidden.

6. The apparatus according to claim 1, wherein the processor is further configured to:
select a new server for deploying a virtual machine that is affected by the first fault; and
create a virtual machine on the selected new server.

7. The apparatus according to claim 1, wherein the self-healing policy information includes a virtual machine identity, fault type information, or self-healing action information.

8. A non-transitory computer-readable storage medium having stored thereon instructions for causing at least one computer system to perform one or more operations, the instructions comprising:
receiving a first fault associated with a Network Functions Virtualization (NFV) system, the NFV system comprising a plurality of layers;
determining that the first fault initiated at a first layer of the NFV system, wherein the first layer of the NFV system is a NFV infrastructure (NFVI) layer;
in response to determining that the first fault initiated at the first layer of the NFV system, a root-cause analysis not being performed on the first fault;
determining, based at least in a part on a self-healing policy information, whether to perform a self-healing operation on the first fault; and
performing the self-healing operation on the first fault when the self-healing policy information indicates that the self-healing operation is to be performed on the first fault.

9. The non-transitory computer-readable storage medium of claim 8, wherein the self-healing policy information includes updated self-healing policy information.

10. The non-transitory computer-readable storage medium of claim 8, the instructions further comprising sending self-healing start information, wherein the self-healing start information indicates a start of the self-healing operation on the first fault.

11. The non-transitory computer-readable storage medium of claim 10, the instructions further comprising sending self-healing complete information, wherein the self-healing complete information indicates completion of the self-healing operation on the first fault.

12. The non-transitory computer-readable storage medium of claim 10, the instructions further comprising sending fault information of the first fault when the self-healing policy information indicates that the self-healing operation on the first fault is forbidden.

13. The non-transitory computer-readable storage medium of claim 8, the instructions further comprising:
selecting a new server for deploying a virtual machine that is affected by the first fault; and
creating a virtual machine on the selected new server.

14. The non-transitory computer-readable storage medium of claim 8, wherein the self-healing policy information includes a virtual machine identity, fault type information, or self-healing action information.

15. A method comprising:
receiving a first fault associated with a Network Functions Virtualization (NFV) system, the NFV system comprising a plurality of layers;
determining that the first fault initiated at a first layer of the NFV system, wherein the first layer of the NFV system is a NFV infrastructure (NFVI) layer;
in response to determining that the first fault initiated at the first layer of the NFV system, a root-cause analysis not being performed on the first fault;
determining, based at least in a part on a self-healing policy information, whether to perform a self-healing operation on the first fault; and
performing the self-healing operation on the first fault when the self-healing policy information indicates that the self-healing operation is to be performed on the first fault.

16. The method of claim 15, wherein the self-healing policy information includes updated self-healing policy information.

17. The method of claim 15, further comprising sending self-healing start information, wherein the self-healing start information indicates a start of the self-healing operation on the first fault.

18. The method of claim 17, further comprising sending self-healing complete information, wherein the self-healing complete information indicates completion of the self-healing operation on the first fault.

19. The method of claim 17, further comprising sending fault information of the first fault when the self-healing policy information indicates that the self-healing operation on the first fault is forbidden.

20. The method of claim 15, further comprising:
selecting a new server for deploying a virtual machine that is affected by the first fault; and
creating a virtual machine on the selected new server.

21. The method of claim 15, wherein the self-healing policy information includes a virtual machine identity, fault type information, or self-healing action information.

* * * * *